(12) United States Patent
Suzuki

(10) Patent No.: US 7,675,579 B2
(45) Date of Patent: Mar. 9, 2010

(54) LIQUID CRYSTAL DRIVING ELECTRODE WITH PROTRUDED BENT TIP, LIQUID CRYSTAL DISPLAY DEVICE, AND MANUFACTURING METHOD THEREOF

(75) Inventor: Teruaki Suzuki, Kanagawa (JP)

(73) Assignee: NEC LCD Technologies, Ltd., Kawasaki, Kanagawa (JP)

( * ) Notice: Subject to any disclaimer, the term of this patent is extended or adjusted under 35 U.S.C. 154(b) by 776 days.

(21) Appl. No.: 11/453,992

(22) Filed: Jun. 16, 2006

(65) Prior Publication Data
US 2006/0290869 A1 Dec. 28, 2006

(30) Foreign Application Priority Data
Jun. 24, 2005 (JP) ............................. 2005-184761

(51) Int. Cl.
*G02F 1/1335* (2006.01)
(52) U.S. Cl. .................... 349/4; 349/142; 349/143; 349/144
(58) Field of Classification Search ......... 349/141–144, 349/145–146
See application file for complete search history.

(56) References Cited

U.S. PATENT DOCUMENTS 3,807,831 A 4/1974 Soref
6,411,358 B2 * 6/2002 Song et al. ................. 349/141
6,429,914 B1 * 8/2002 Kubota et al. ................ 349/86
6,459,465 B1 * 10/2002 Lee ........................... 349/141
6,795,150 B2 * 9/2004 Yanagawa et al. ........... 349/141
6,859,248 B2 * 2/2005 Matsumoto et al. ......... 349/141
2005/0078256 A1 4/2005 Hong

FOREIGN PATENT DOCUMENTS

| CN | 1603915 A | 4/2005 |
|---|---|---|
| JP | 56-91277 | 7/1981 |
| JP | 7-36058 | 2/1995 |
| JP | 10-307295 | 11/1998 |
| JP | 2001-305567 | 10/2001 |
| KR | 10-2004-0107648 | 12/2004 |

OTHER PUBLICATIONS

Chinese Office Action dated Sep. 21, 2007.

* cited by examiner

*Primary Examiner*—David Nelms
*Assistant Examiner*—Hoan C Nguyen
(74) *Attorney, Agent, or Firm*—McGinn IP Law Group, PLLC

(57) ABSTRACT

A liquid crystal display device of a multiple-domain in-plane switching mode applies to mutually engaged comb-shaped electrodes for each pixel region. The comb-shaped electrode has bent portions each in a double V shape which is formed as a comb-tooth pattern by causing a bent tip being bent into a V shape to protrude further outward. This structure stabilizes turning directions of liquid crystal molecules in the vicinity of a boundary between each two neighboring regions of multiple domains and suppresses display coloring attributable to a change in a view angle.

21 Claims, 16 Drawing Sheets

LIQUID CRYSTAL DRIVING ELECTRODE WITH PROTRUDED BENT TIP, LIQUID CRYSTAL DISPLAY DEVICE, AND MANUFACTURING METHOD THEREOF

BACKGROUND OF THE INVENTION

1. Field of the Invention

The present invention relates to a liquid crystal driving electrode, and a liquid crystal display device (LCD), and a manufacturing method thereof. More specifically, the present invention relates to an active-matrix LCD (AM-LCD) applied to the in-plane switching (IPS) mode and a manufacturing method thereof.

2. Description of the Prior Art

LCDs are generally characterized by thin profile, light weight, and low power consumption. In particular, AM-LCDs, which drive individual pixels arranged in a horizontal and vertical matrix by use of active elements, are regarded as high-quality flat panel display devices. Among them, thin film transistor LCDs (TFT-LCDs) applying thin film transistors (TFTs) as the active elements for switching the individual pixels are widely used.

A conventional AM-LCD utilizes a twisted nematic (TN) type electro-optical effect. Moreover, liquid crystal molecules are sandwiched between two substrates and are activated by applying an electric field that is substantially perpendicular to substrate surfaces thereto. Meanwhile, a method applying comb-shaped electrodes as driving electrodes has been disclosed in U.S. Pat. No. 3,807,831 (hereinafter referred to as Patent Document 1) as a technique for an IPS-LCD which activates liquid crystal molecules by an electric field being substantially parallel to substrate surfaces.

Moreover, Japanese Unexamined Patent Publication No. S56 (1981)-091277 (hereinafter referred to as Patent Document 2) discloses another technique applying comb-shaped electrodes that are engaged with each other like the foregoing case. The object of this technique is to reduce parasitic capacitance between a common electrode and a drain bus line or between the common electrode and a gate bus line in an AM-LCD applying the TN type electro-optical effect.

Japanese Unexamined Patent Publication No. H07 (1995)-036058 (hereinafter referred to as Patent Document 3) disclosed a technique to apply the IPS mode to a TFT-LCD. Moreover, Japanese Unexamined Patent Publication No. H10 (1998)-307295 (hereinafter referred to as Patent Document 4) disclosed a technique which bends an electrode generating a horizontal electric field. In Patent Document 4, when applying an electric field, a driving direction (a turning direction) of liquid crystal molecules is changed depending on the region by use of these bent portions, thereby reducing display coloring at an oblique view angle.

FIG. 1A and FIG. 1B show an example of a configuration of the IPS-LCD disclosed in Patent Document 4. FIG. 2 is a view for explaining electric lines of force generated by driving electrodes shown in FIG. 1A. As shown in FIG. 1A, this LCD includes each pixel region in a region surrounded by multiple gate bus lines 55 extending in a horizontal direction and multiple drain bus lines 56 extending substantially in a vertical direction in a bent manner. Such pixel regions are arranged in a horizontal and vertical matrix to form a display area as a whole. An active element 54 is a TFT made of amorphous silicon (hereinafter abbreviated as a-Si). Moreover, the each active element 54 is formed in the vicinity of the crossing of the gate bus line 55 and the drain bus line 56 for each pixel. Meanwhile, since the drain bus lines 56 extend in the vertical direction in the bent manner in FIG. 1A, the shape of the pixel constituting the horizontal and vertical matrix is bent into a V shape.

Pixel electrodes 71D and common electrodes 72D for generating an electric field are formed into a laterally-facing ladder shape (a comb shape) as illustrated in FIG. 1A. The pixel electrodes 71D and the common electrodes 72D are alternately located in the steps of the ladder. To be more precise, the respective steps of the ladder are bent into the V shape in the respective pixel regions to be aligned with the drain bus lines 56. At the bent position, the pixel region is divided into a sub region 1 on an upper side and a sub region 2 on a lower side in the drawing. The direction of inclination of the electrode caused by bending in the V shape is shifted clockwise in the vertical direction of the drawing in terms of the sub region 1. On the contrary, the direction of inclination of the electrode caused by bending in the V shape is shifted counterclockwise in the vertical direction of the drawing in terms of the sub region 2. Each of the pixel electrodes 71D and the common electrodes 72D partially overlap each other with an interlayer insulating film 57 disposed therebetween (see FIG. 1B). Such an overlapping portion constitutes an additional capacitance. To avoid disconnection of the common electrode 72D, it is formed to stride over the adjacent pixel in the direction of extension of the gate bus line 55 by using two lines of a B line and a C line located on the upper side and the lower side of FIG. 1A.

As shown in FIG. 1B, the common electrodes 72D, the pixel electrodes 71D, and the drain bus lines 56 are formed on a first substrate 11. The common electrodes 72D are insulated from the pixel electrodes 71D and the drain bus lines 56 by use of the interlayer insulating film 57. Although it is not illustrated in FIG. 1B, the gate bus lines 55, like the common electrodes 72D, are also insulated from the pixel electrodes 71D and the drain bus lines 56 by use of the interlayer insulating film 57. These structures formed on the substrate 11 are covered with a passivation film 59. An alignment film 31 made of an organic polymer film is formed on a surface of an active-matrix substrate including these constituents, and a surface thereof is subjected to an aligning treatment.

Meanwhile, color filters (not shown) including the three primary colors of red, green, and blue are provided on a second substrate 12 constituting a counter substrate to the active-matrix substrate to correspond to the respective pixel regions, and a light-shielding black matrix (not shown) is provided in the region other than the regions corresponding to the respective pixel regions. In addition, an alignment film 32 made of an organic polymer film is formed on a surface thereof, and a surface of the alignment film 32 is subjected to an aligning treatment.

The active-matrix substrate is put on the counter substrate to keep a certain interval while the surfaces having the alignment films 31 and 32 being set inside, and a liquid crystal layer 20 is inserted between the both substrates. Moreover, a pair of polarizing plates (not shown) are disposed outside the both substrates.

As shown in FIG. 1A, the surfaces of the alignment films 31 and 32 are uniformly subjected to the aligning treatment such that liquid crystal molecules 21 are aligned in parallel to the longitudinal direction of the drawing (the vertical direction in the drawing) when no electric field is applied. Directions of transmission axes of this pair of polarizing plates are set perpendicular to each other and the transmission axis of one of the polarizing plates coincides with the initial aligning direction (the aligning direction at the time of no electric field) of the liquid crystal which is uniformly subjected to the aligning treatment.

Next, a manufacturing process of the liquid crystal display device of FIG. 1A will be described. First, the gate bus lines 55 and the common electrodes 72D made of chromium (Cr) are formed on the first substrate 11 such as a glass substrate, and the interlayer insulating film 57 made of silicon nitride ($SiN_x$) is formed to cover these constituents. Subsequently, a-Si film serving as an active layer of transistors is formed into island shapes on the gate bus lines 55 with the interlayer insulating film 57 interposed in therebetween. Further, the drain bus lines 56 and the pixel electrodes 71D made of Cr are formed thereon. Next, the passivation film 59 made of $SiN_x$ is formed to cover these structures. The color filters and the light-shielding black matrix are formed on the second substrate 12 such as a glass substrate.

As described above, alignment films made of polyimide are formed on the respective surfaces of the active-matrix substrate and the color filter substrate constructed. The alignment films are uniformly subjected to the aligning treatment. Thereafter, the both substrates are put together to keep an interval of 4.5 μm, for example. Then, for example, nematic liquid crystal having refractive index anisotropy of 0.067, is filled between the substrates within a vacuum chamber. Thereafter, the polarizing plates are attached to the outer surfaces of the both substrates.

In the configuration shown in FIG. 1A, a liquid crystal driving electric field upon voltage application is generated in the direction slightly inclined clockwise relative to the lateral direction of the drawing in terms of the sub region 1 and is generated in the direction slightly inclined counterclockwise relative to the lateral direction of the drawing in terms of the sub region 2. Accordingly, at the time of no electric field, liquid crystal molecules 21 that are uniformly aligned along the longitudinal direction in the drawing (the vertical direction in the drawing) are turned counterclockwise in the sub region 1 and clockwise in the sub region 2, respectively.

As described above, the turning directions of the liquid crystal molecules are different between the two sub regions 1 and 2. In this way, it is possible to suppress display coloring attributable to a change in the view angle.

FIG. 3A is a plan view for explaining another example of the configuration of the IPS-LCD disclosed in Patent Document 4. Meanwhile, FIG. 3B is a view for explaining electric lines of force generated by electrodes in FIG. 3A. The configuration in FIG. 3A is common to the configuration in FIG. 1A in many aspects. However, pixel electrodes 71E and common electrodes 72E have protrusions extending along boundaries of sub regions at bent portions. In the configuration shown in FIG. 3A, it is possible to avoid reverse turns of the liquid crystal molecules relative to desired turning directions in the respective sub regions even in the vicinity of the regions where the electrodes are bent into the V shape. Accordingly, it is possible to achieve uniform and stable display.

FIG. 4A is a plan view for explaining still another example of the configuration of the IPS-LCD which is disclosed in Japanese Unexamined Patent Publication No. 2001-305567 (hereinafter referred to as Patent Document 5) and FIG. 4B is a plan view showing driving electrodes thereof. In this LCD, pixel electrodes and common electrodes are adjacently provided on one of substrates. The intervals between these two electrodes are equal to 5 μm or more when the electrodes are viewed from a parallel direction to the surface of the substrate toward the direction of extension of signal lines. The configuration in FIG. 4A shows the example of this LCD. As shown in the drawing, mutually opposed surfaces of a pixel electrode 71F and a common electrode 72F have curved portions.

When there are the intervals of 5 μm or more between the pixel electrodes 71F and the common electrodes 72F, a rubbing cloth can enter groove portions between the pixel electrodes 71F and the common electrodes 72F favorably. Accordingly, spaces between the electrodes are uniformly subjected to a rubbing treatment whereby liquid crystal molecules 21 seem to be uniformly aligned in the direction of signal lines 3. Moreover, since the mutually opposed surfaces of the pixel electrodes 71F and the common electrodes 72F have the curved portions, the directions of the electric lines of force vary depending on the location of the curved portions. For this reason, the directions of the liquid crystal molecules 21 also vary upon application of an arbitrary voltage, and a view angle characteristic in an oblique direction is thereby improved.

Nevertheless, the above-described IPS-LCDs of the prior art still have unsolved problems. Specifically, disturbance in liquid crystal domains is apt to occur in the configuration shown in FIG. 1A due to the lack of a structure for stabilizing the boundary portions of the sub regions. In particular, if the size of each domain is minimized for the purpose of achieving higher definition of pixels, the disturbance in the liquid crystal domains is easy to be occurred as adjacent liquid crystal domains may be irregularly fused and necessary liquid crystal domains may disappear. In such a case, the display may become rough or blocky. Such a problem may be notable particularly when a panel is pressed with a finger. When the disturbance in the liquid crystal domains is caused by finger pressing or the like, it is necessary to stop a device (cut off a power source) and leave the device for a while in order to recover the liquid crystal domains.

In the IPS-LCD in which the electrodes for generating the lateral electric field are bended into the V shape, the turning directions of the liquid crystal molecules in the respective sub regions are more clearly defined due to a relation between the direction of the electric field and the initial aligning direction of the liquid crystal as the bent angle becomes greater. Accordingly, the turning directions of the liquid crystal molecules at the boundary portions are stabilized. Meanwhile, in view of a voltage transmission rate characteristic, it is preferable to set the angle between the direction of extension of the electrodes and the initial aligning direction of the liquid crystal approximately in a range of 5 to 25 degrees. This is because it is necessary to turn the direction of liquid crystal alignment virtually in the amount of 45 degrees using the electric field for the purpose of switching between a dark (black) state and a bright (white) state. That is, according to the prior art, it is not easy to set an appropriate angle for achieving the favorable voltage transmission rate characteristic while stabilizing the boundaries of the sub regions.

Meanwhile, in the configuration shown in FIG. 3A, the protrusions are formed at the bent portions in order to stabilize the liquid crystal domains in the respective sub regions. In this configuration, it is possible to stabilize the liquid crystal domains since the direction of the electric field is regulated in the vicinity of the bent portions. However, a distance between the pixel electrode 71 and the common electrode 72 is reduced in the vicinity of the protrusions of the electrodes. Accordingly, a stronger electric field is generated in that region as compared to the region actually used for the display. When performing a dark (black) display, a voltage below a threshold voltage for causing a change in the alignment of the liquid crystal is usually applied (in the case of a normally black mode). However, the relatively strong electric field in the vicinity of the protrusion still leads to a change in the aligning direction of the liquid crystal molecules in that case, thereby causing light leakage (a black blur) that triggers deterioration in display contrast. In addition, this configuration also has a problem that a short circuit between electrodes is apt to occur in a region in the vicinity of the protrusion of the electrode where a distance between the liquid crystal driving electrodes is short.

Meanwhile, in the configuration shown in FIG. 4A, the mutually opposed surfaces of the pixel electrode 71F and the common electrode 72F have the curved portions so that the directions of the electric lines of force vary depending on the location of the curved portions of the electrodes. For this reason, this configuration bears such a problem that it is not possible to define a uniform angle between the direction of extension of the electrode and the initial aligning direction of the liquid crystal in terms of the voltage transmission rate characteristic in sub region for the purpose of optimization.

SUMMARY OF THE INVENTION

In view of the above-mentioned problems, the present invention provides an IPS-LCD which can suppress coloring attributable to variation in the direction of a view angle and while minimizing disturbance in liquid crystal domains.

The present invention provides a liquid crystal driving electrode for an LCD applying mutually engaged comb-shaped electrodes to each pixel region, in which each of the comb-shaped electrodes has bent portions each in a double V shape which is formed as a comb-tooth pattern by causing a bent tip being bent into a V shape to protrude further outward.

The LCD in the present invention is an IPS-LCD, which can apply the comb-shaped electrodes each including the above-described bent portions each in the double V shape. Moreover, the comb-shaped electrode includes a pixel electrode and a common electrode.

In the LCD of the present invention, the pixel region is divided into sub regions having different aligning directions of liquid crystal molecules upon application of a driving current at a boundary defined as a line joining midpoints of the bent portions in the double V shape of the respective electrodes in the comb-shaped electrode.

In the LCD of the present invention, either a positive type liquid crystal composition or a negative type liquid crystal composition can be used for to a liquid crystal layer. Moreover, when the positive type liquid crystal composition is used for the liquid crystal layer, an angle defined between an initial aligning direction of the liquid crystal molecules in the liquid crystal layer and a direction of extension of the electrodes at the portions other than the double V shaped bent portions in the comb-shaped electrode is set in a range of 5 to 25 degrees. Meanwhile, an angle defined between the initial aligning direction of the liquid crystal molecules in the liquid crystal layer and a direction of extension of the electrodes at the double V shaped bent portions in the comb-shaped electrode is set in a range of 15 to 75 degrees.

In the LCD of the present invention, when the positive type liquid crystal composition is used for the liquid crystal layer, an angle $\theta_2$ defined by the direction of extension of the electrodes at the double V shaped bent portions in the comb-shaped electrode is greater than an angle $\theta_1$ defined between the initial aligning direction of the liquid crystal molecules in the liquid crystal layer and the direction of extension of the electrodes at the portions other than the double V shaped bent portions in the comb-shaped electrode. The angles $\theta_1$ and $\theta_2$ preferably satisfy the following formula (1).

$$\theta_2 \geqq 2\theta_1 \tag{1}$$

In the LCD of the present invention, when the negative type liquid crystal composition is used for the liquid crystal layer, the angle defined between the initial aligning direction of the liquid crystal molecules in the liquid crystal layer and the direction of extension of the electrodes at the portions other than the double V shaped bent portions in the comb-shaped electrode is set in a range of 85 to 65 degrees. Meanwhile, the angle defined between the initial aligning direction of the liquid crystal molecules in the liquid crystal layer and the direction of extension of the electrodes at the double V shaped bent portions in the comb-shaped electrode is set in a range of 75 to 15 degrees.

In the LCD of the present invention, when the positive type liquid crystal composition is used for the liquid crystal layer, an angle $\theta_4$ defined by the direction of extension of the electrodes at the double V shaped bent portions in the comb-shaped electrode and an angle $\theta_3$ defined between the initial aligning direction of the liquid crystal molecules in the liquid crystal layer and the direction of extension of the electrodes at the portions other than the double V shaped bent portions in the comb-shaped electrode satisfy the following formula (2), and preferably satisfy the following formula (3).

$$\theta_3 > \theta_4 \tag{2}$$

$$(90°-\theta_4) \geqq 2(90°-\theta_3) \tag{3}$$

In the LCD of the present invention, a distance between electrodes at the bent portions in the comb-shaped electrode is set greater than 0.2 times as long as a distance between electrodes at the portions other than the bent portions in the comp-shaped electrode. Moreover, an electrode width at the bent portions in the comb-shaped electrode can be set smaller than an electrode width at the portions other than the bent portions in the comb-shape electrode.

In the LCD of the present invention, the pixel electrode and the common electrode may be formed on different layers or on the same layer.

In the IPS-LCD of the present invention, the liquid crystal driving electrode is configured to have the double V shaped bent portions. This configuration stabilizes turning directions of the liquid crystal molecules in the vicinity of the boundary defined by the double V shaped bent portions. As a result, it is possible to obtain a liquid crystal display device having excellent image quality that can achieve uniform and even display with low coloring attributable to a change in a direction of a view angle.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

Figure 3A:
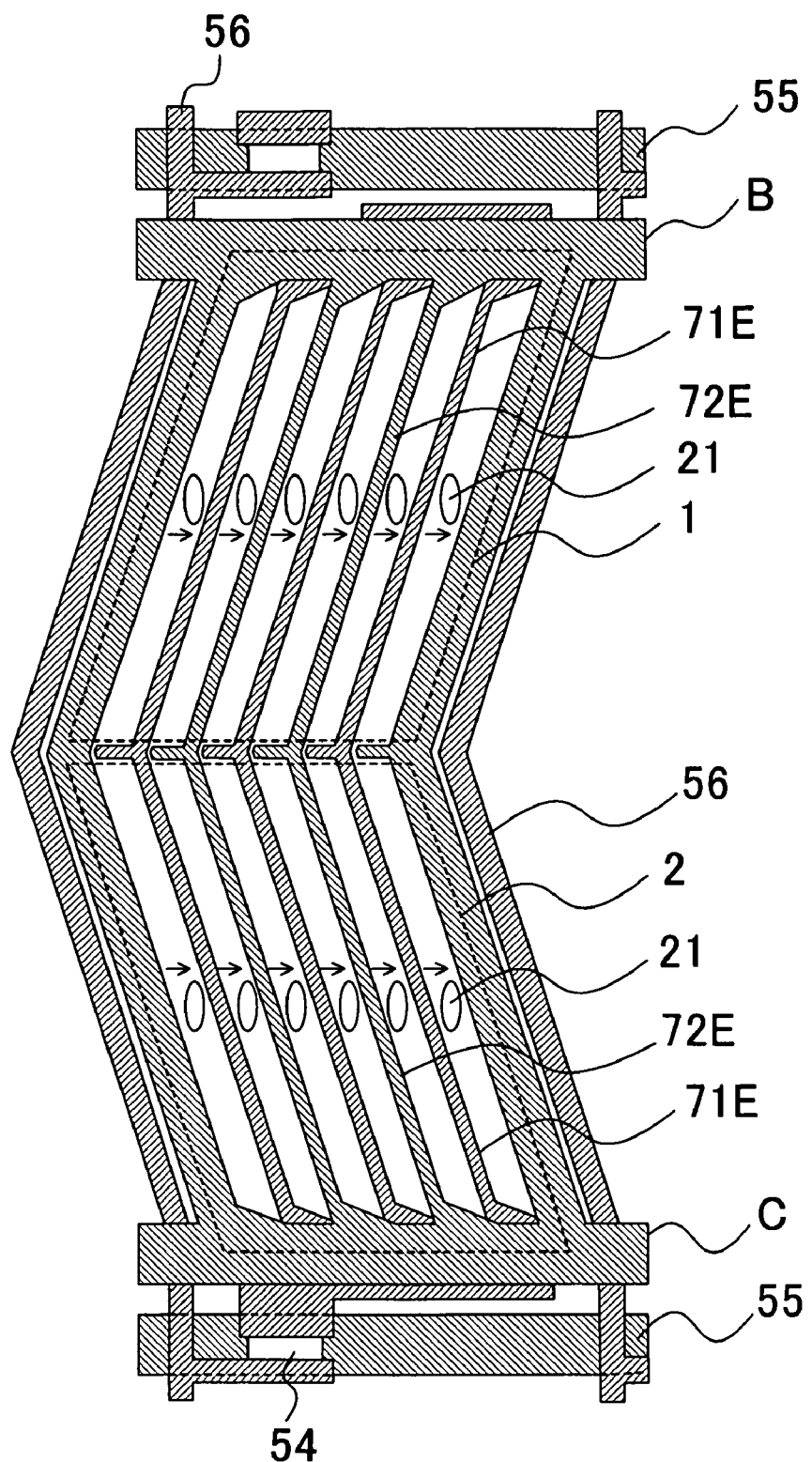
FIG. 3A is a plan view for explaining a configuration of another conventional LCD.
Figure 5A:
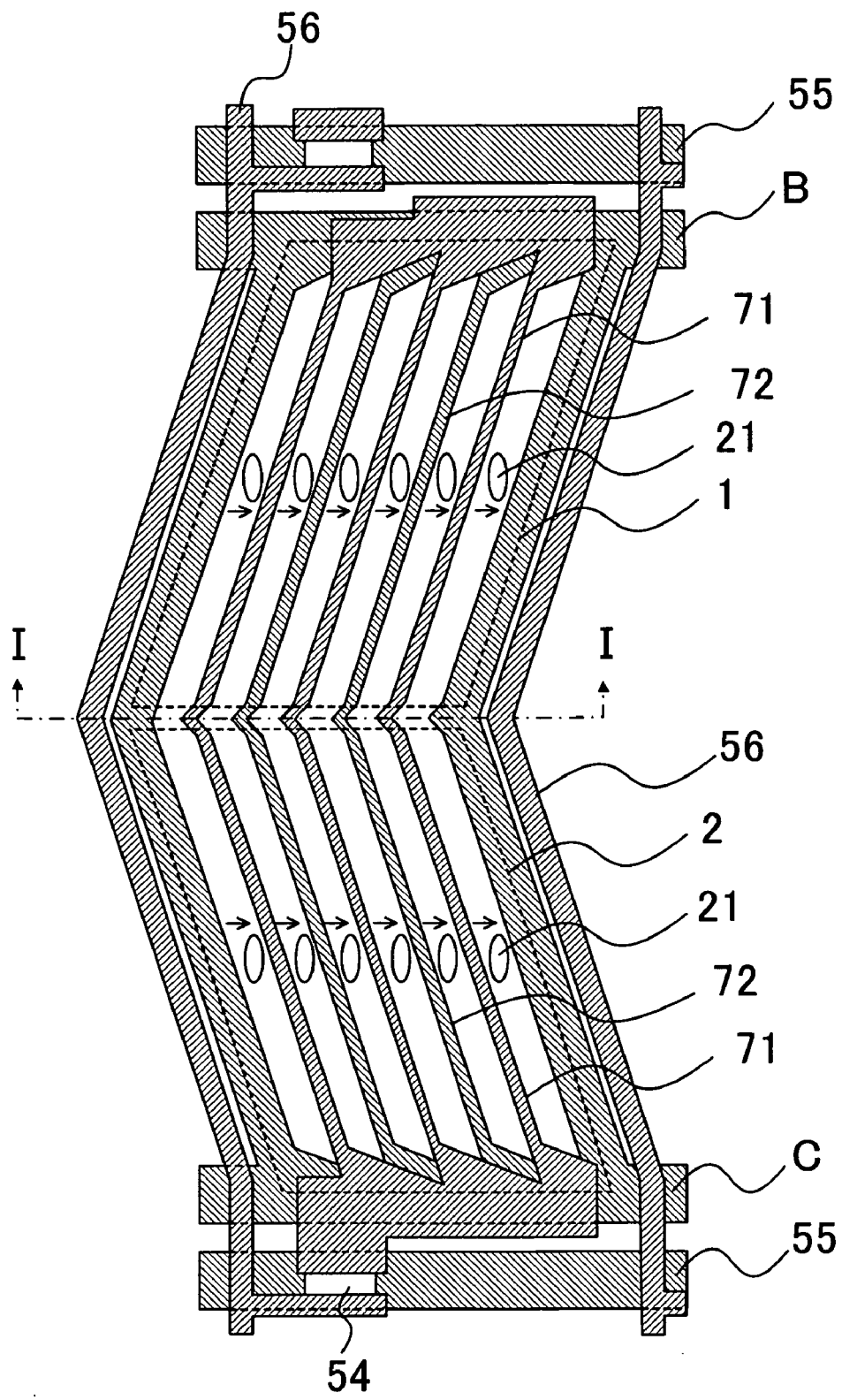
FIG. 5A is a plan view for explaining a configuration of an LCD according to an embodiment of the present invention.
Figure 5B:
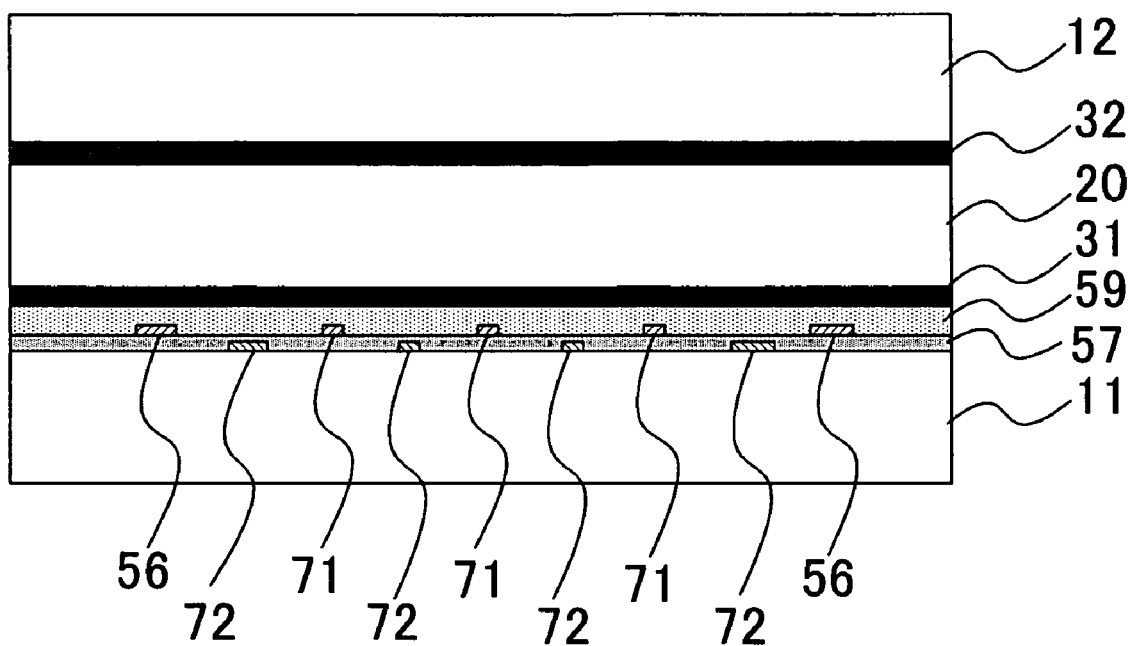
FIG. 5B is a cross-sectional view taken along the I-I line in FIG. 5A.

An embodiment of a liquid crystal display device (LCD) according to the present invention will now be described with reference to the accompanying drawings. As shown in FIG. 5A and FIG. 5B, a configuration of the LCD of this embodiment is common to the configuration of the prior art shown in FIG. 3A in many aspects. Reference numerals in FIG. 5A and FIG. 5B identical to those in FIG. 3A represent the same constituents. In the LCD of this embodiment, pixel electrodes 71 and common electrodes 72 also applies to a comb-shaped electrode in which they are mutually engaged in pixel region. Nevertheless, the comb-shaped electrodes of this embodiment has a shape pattern in which a comb-tooth shape thereof is bent in the middle to form a V shape and tips in the vicinity of the bent portions each in this V shape are caused to protrude further outward. Specifically, the bent portions in the comb-shaped electrode have the shape of connecting two V shapes. Such a bent shape of this comb-shape electrode will be hereinafter referred to as a double V shape. An angle defined between the direction of extension of the pixel electrodes 71 or the common electrodes 72 and an initial aligning direction (which is the vertical direction in the drawing) of liquid crystal is set greater than angles in other regions in the vicinity of a boundary between a sub region 1 and a sub region 2.

Figure 6:
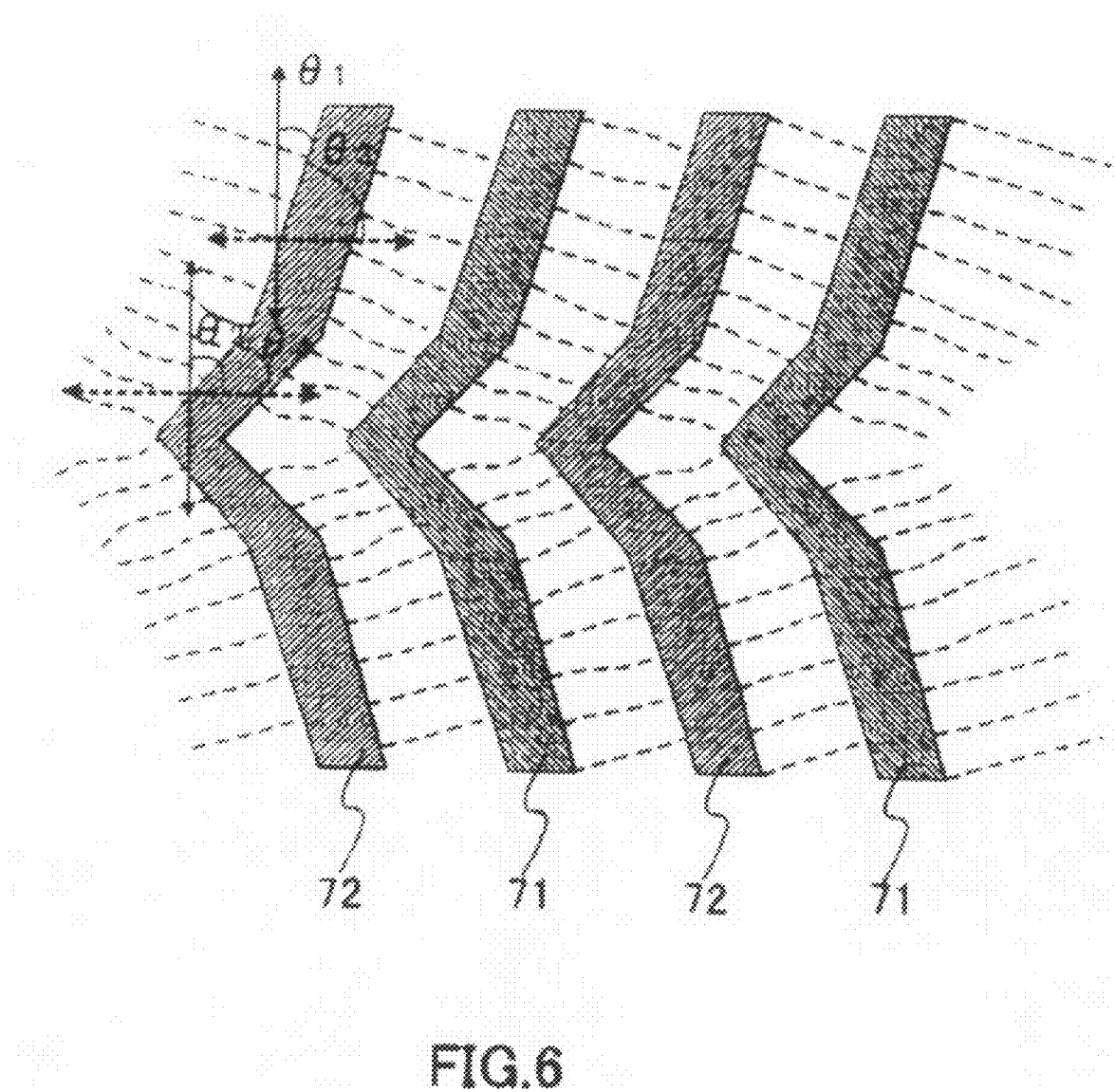
FIG. 6 is a plan view for explaining electric lines of force of liquid crystal driving electrodes shown in FIG. 5A.

FIG. 6 is an enlarged plan view of the vicinity of the sub regions provided for explaining a function according to the configuration of this embodiment. FIG. 6 illustrates the double V shaped bent portions formed by use of the pixel electrodes 71 and the common electrodes 72, and an aspect of electric lines of force (shown in dotted lines) of a liquid crystal driving electric field to be generated by these electrodes 71 and 72.

As shown in FIG. 6, according to the configuration of this embodiment, the directions of the electric lines of force are substantially different on both sides of the boundary for the sub regions. Therefore, turning directions of the liquid crystal are precisely regulated in the respective regions. Accordingly, the liquid crystal is not turned in the reverse direction to the desired turning direction in of the sub regions. That is, the boundary of liquid crystal domains in the sub regions is stably fixed. As a result, it is possible to perform uniform and stable display.

First Example

A first example of the present invention is similar to the LCD shown in FIG. 5A. As shown in FIG. 5A, this example has the configuration in which the pixel electrodes 71 and the common electrodes 72 have the double V shape at the bent portions thereof. Moreover, the angle defined between the direction of extension of the pixel electrodes 71 or the common electrodes 72 and the initial aligning direction (which is the vertical direction in the drawing) of the liquid crystal is set greater than the angles in other regions in the vicinity of the boundary between the sub regions. To be more precise, the angle defined between the direction of extension of the pixel electrodes 71 or the common electrodes 72 and the initial aligning direction of the liquid crystal is set to 15 degrees in the region mainly used for display, whereas the relevant angle is set to 45 degrees in the vicinity of the boundary between the sub region 1 and the sub region 2. Here, positive type liquid crystal is applied to the liquid crystal in a liquid crystal layer 20.

As shown in FIG. 5A, in this LCD each pixel region is formed in a region surrounded by multiple gate bus lines 55 extending in a horizontal direction and multiple drain bus lines 56 extending substantially in the vertical direction in a bent manner. Such pixel regions are arranged in a horizontal and vertical matrix to form a display area as a whole. An active element 54 is a thin film transistor (TFT) made of amorphous silicon (a-Si). The active element 54 is formed in the vicinity of a junction of the gate bus line 55 and the drain bus line 56 to correspond to each pixel. Meanwhile, since the drain bus lines 56 extend in the vertical direction in the bent manner in FIG. 5A, the shape of the pixel constituting the horizontal and vertical matrix is bent into the double V shape.

The pixel electrodes 71 and the common electrodes 72 for generating a liquid crystal driving electric field are formed into a lateral ladder shape (a comb shape) as illustrated in FIG. 5A. The pixel electrodes 71 and the common electrodes 72, which are counter electrodes to the pixel electrodes 71, are alternately located in the steps of the ladder. To be more precise, the respective steps of the ladder are bent into the double V shape to be aligned with the drain bus lines 56 in the respective pixel regions. At the bent position, each of the pixel electrodes 71 and the common electrodes 72 splits the pixel region into the sub region 1 on the upper side and the subregion 2 on the lower side in the drawing. The direction of inclination of the electrode caused by bending in the V shape is shifted clockwise in the vertical direction of the drawing in terms of the sub region 1 and is shifted counterclockwise in the vertical direction of the drawing in terms of the sub region 2. Each of the pixel electrodes 71 and the common electrodes 72 partially overlap each other with an interlayer insulating film 57 disposed therebetween (see FIG. 5B). Such an overlapping portion constitutes an additional capacitance. To avoid disconnection of the common electrode 72, it is formed to stride over the adjacent pixel in the direction of extension of the gate bus line 55 by using two lines (indicated by B and C) located on the upper side and the lower side of FIG. 5A.

As shown in FIG. 5B, the common electrodes 72, the pixel electrodes 71, and the drain bus lines 56 are formed on a first substrate 11. The common electrodes 72 are insulated from the pixel electrodes 71 and the drain bus lines 56 by use of the interlayer insulating film 57. Although it is not illustrated in FIG. 5B, the gate bus lines 55, like the common electrodes 72, are also insulated from the pixel electrodes 71 and the drain bus lines 56 by use of the interlayer insulating film 57. These structures formed on the substrate 11 are covered with a passivation film 59. An alignment film 31 made of an organic polymer film is formed on a surface of an active-matrix substrate including these constituents, and a surface thereof is subjected to an aligning treatment.

Meanwhile, color filters (not shown) including the three primary colors of red, green, and blue are provided on a second substrate 12 constituting a counter substrate to the active-matrix substrate to correspond to the respective pixel regions. Moreover, a light-shielding black matrix (not shown) is provided in the region other than the regions corresponding to the respective pixel regions. In addition, an alignment film 32 made of an organic polymer film is formed on a surface thereof, and a surface of the alignment film 32 is subjected to an aligning treatment.

The active-matrix substrate is put on the counter substrate to keep a certain interval while the surfaces having the alignment film 31 and the alignment film 32 being set inside, and the liquid crystal layer 20 is filled between the both substrates. Moreover, a pair of polarizing plates (not shown) are disposed outside the both substrates.

As shown in FIG. 5A, the surfaces of the alignment film 31 and the alignment film 32 are uniformly subjected to the aligning treatment such that liquid crystal molecules 21 are aligned in parallel to the longitudinal direction of the drawing (the vertical direction in the drawing) when no electric field is applied. Directions of transmission axes of this pair of polarizing plates are set perpendicular to each other and the transmission axis of one of the polarizing plates coincides with the initial aligning direction (the aligning direction at the time of no electric field) of the liquid crystal which is uniformly subjected to the aligning treatment.

Next, a manufacturing process of the LCD of FIG. 5A will be described. First, the gate bus lines 55 and the common electrodes 72 made of chromium (Cr) are formed on the first substrate 11 such as a glass substrate, and the interlayer insulating film 57 made of $SiN_x$ is formed to cover these constituents. Subsequently, an a-Si film serving as an active layer of transistors is formed into island shapes on the gate bus lines 55 with the interlayer insulating film 57 imposed in therebetween. Further, the drain bus lines 56 and the pixel electrodes 71 made of Cr are formed thereon. Here, the common electrodes 72 and the pixel electrodes 71 are formed into comb-tooth shapes by bending as illustrated in FIG. 5A. Then, the bent portions in the common electrodes 72 and the pixel electrodes 71 are patterned into the shape in which the tip ends of the portions bent into the V shape are caused to protrude further outward by the lithography method. Next, the passivation film 59 made of $SiN_x$ is formed to cover these structures. The color filters and the light-shielding black matrix are formed on the second substrate 12 such as a glass substrate.

The alignment films made of polyimide are formed on the respective surfaces of the active-matrix substrate and the color filter substrate constructed as described above. The alignment films are uniformly subjected to the aligning treatment. Thereafter, the both substrates are put together to keep an interval of 4.5 μm, for example. Then, positive-type nematic liquid crystal having refractive index anisotropy of 0.067, for example, is filled between the both substrates in a vacuum chamber. Thereafter, the polarizing plates are attached to the outer surfaces of the both substrates.

In the configuration shown in FIG. 5A, the liquid crystal driving electric field upon voltage application is generated in the direction slightly inclined clockwise relative to the lateral direction of the drawing in terms of the sub region 1 and is generated in the direction slightly inclined counterclockwise relative to the lateral direction of the drawing in terms of the sub region 2. Accordingly, liquid crystal molecules 21 that are uniformly aligned along the longitudinal direction in the drawing (the vertical direction in the drawing) at the time of no electric field are turned counterclockwise in the sub region 1 and clockwise in the sub region 2, respectively.

By this configuration, the turning directions of the liquid crystal molecules are made different between the two sub regions 1 and 2, and the turning directions of the liquid crystal molecules are stabilized in the vicinity of the boundary between the sub regions 1 and 2. For this reason, it is possible to suppress display coloring attributable to a change in the view angle, and to securely obtain the liquid crystal display device having excellent image quality that can achieve uniform and stable display.

First Comparative Example

Figure 1A:
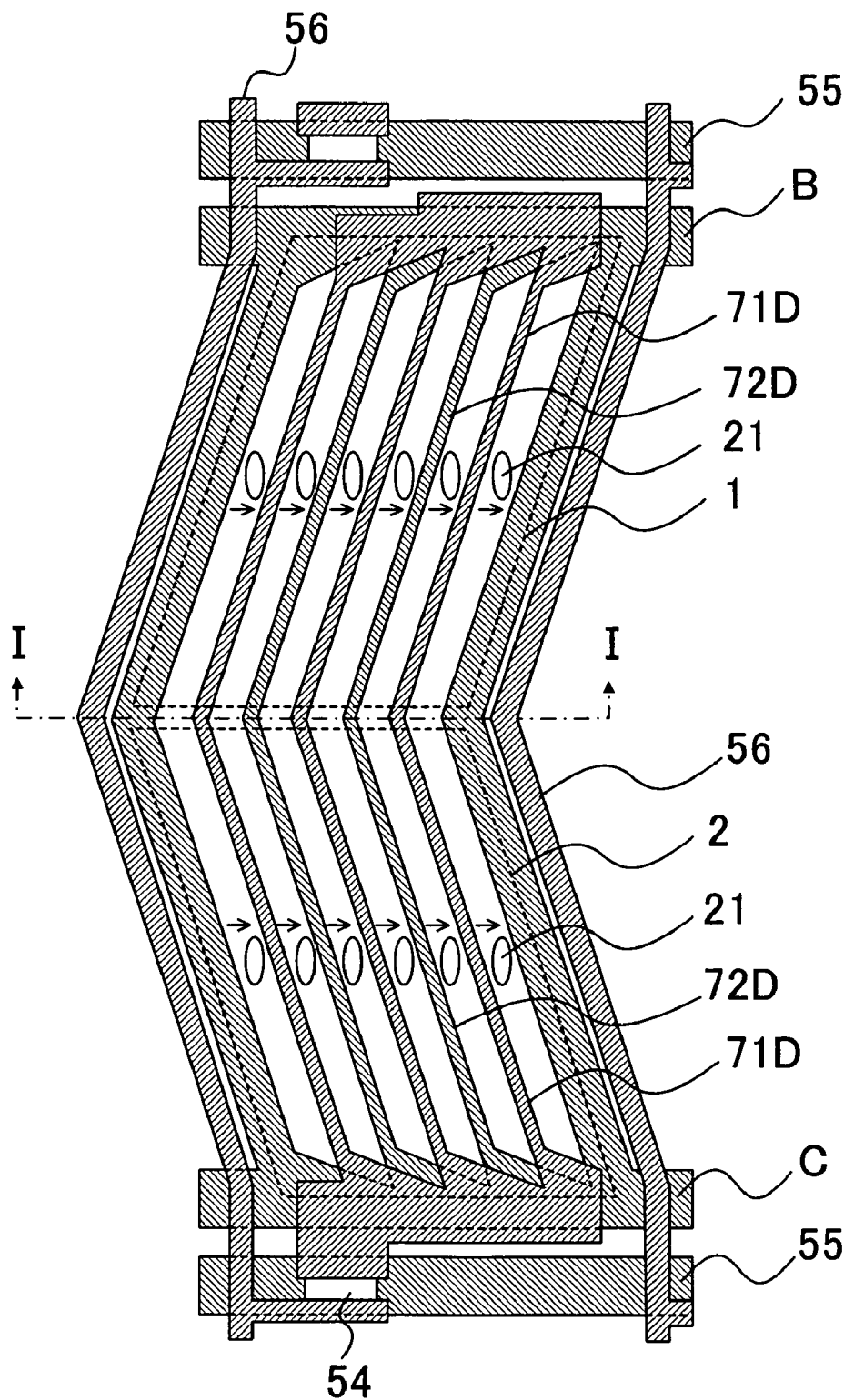
FIG. 1A is a plan view for explaining a configuration of a conventional liquid crystal display device (LCD)
Figure 1B:
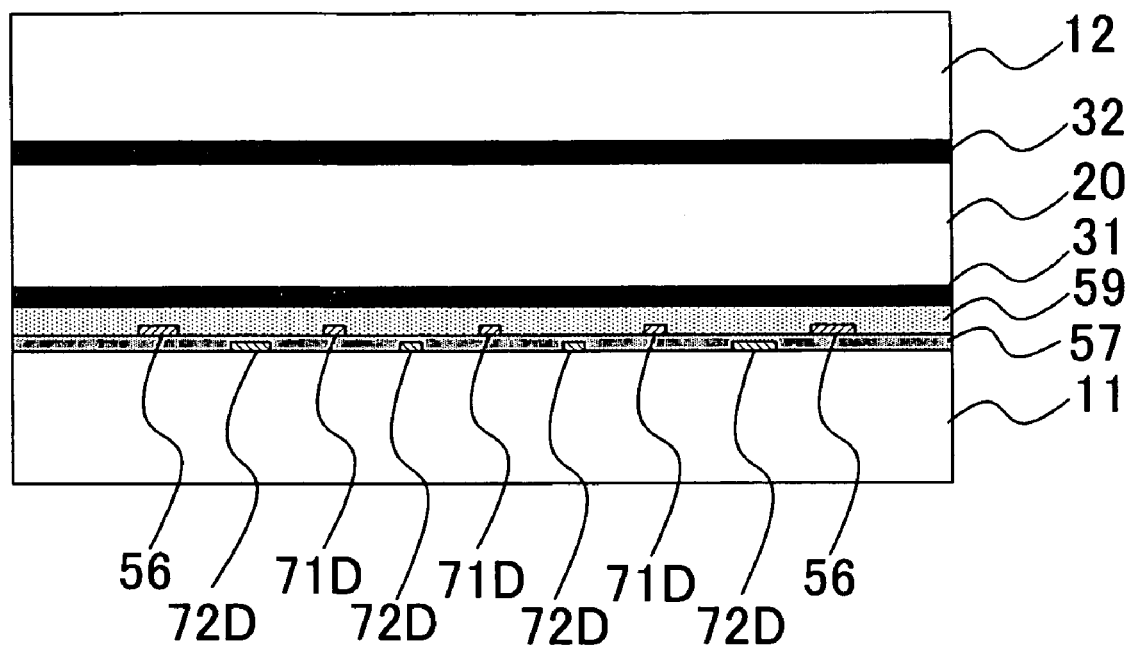
FIG. 1B is a cross-sectional view taken along the I-I line in FIG. 1A.
Figure 2:
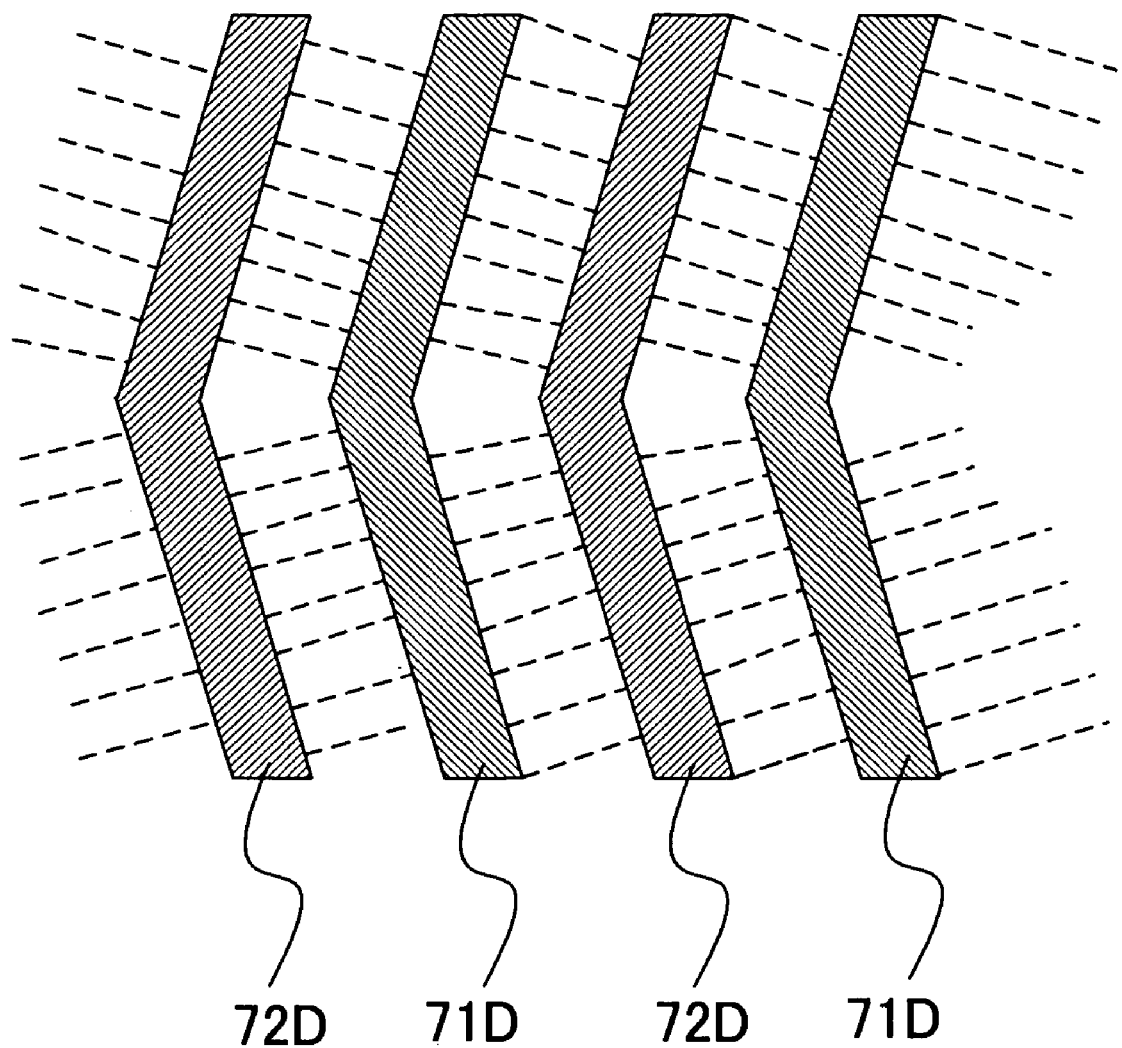
FIG. 2 is a plan view for explaining electric lines of force of liquid crystal driving electrodes shown in FIG. 1A.

A first comparative example relevant to the first example of the present invention will be described with reference to FIG. 2. FIG. 2 illustrates pixel electrodes 71D, common electrodes 72D, and an aspect of electric lines of power (dotted lines) of a liquid crystal electric field generated by these electrodes. When comparing FIG. 2 with FIG. 6, a difference in the direction of the electric lines of power between the two sides of the boundary for the sub regions is smaller in the case of FIG. 2. Therefore, in the electrode structure shown in FIG. 2, it is more difficult to accurately define the turning directions of the liquid crystal molecules in the respective regions. Accordingly, the boundary between the sub regions may be deviated from the predetermined position due to fluctuation of the aligned state of the liquid crystal molecules, an effect of a mechanical impact from outside and the like.

Second Comparative Example

Figure 3B:
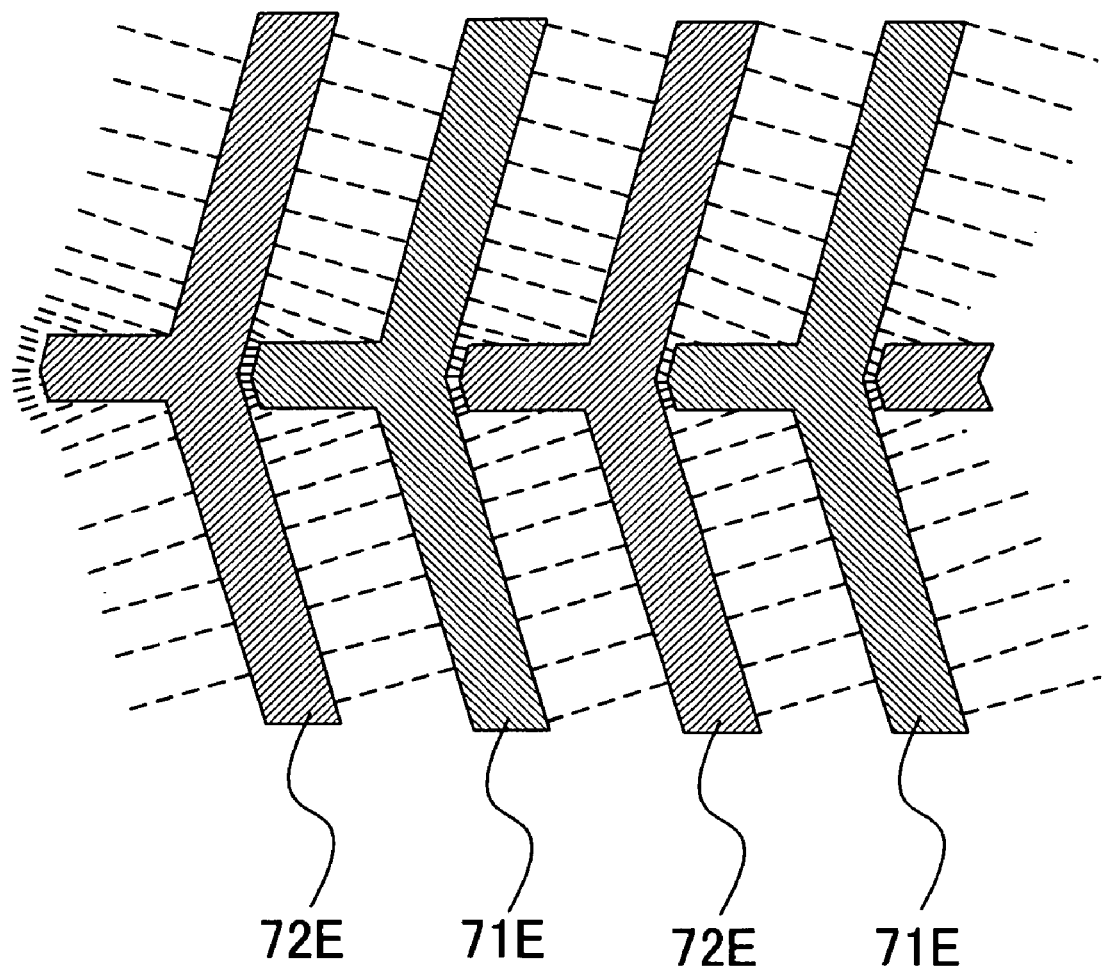
FIG. 3B is a cross-sectional view taken along the I-I line in FIG. 3A.

A second comparative example relevant to the first example of the present invention will be described with reference to FIG. 3B. FIG. 3B illustrates pixel electrodes 71E, common electrodes 72E, and an aspect of electric lines of power of a liquid crystal electric field generated by these electrodes. In FIG. 3B, the pixel electrodes 71E and the common electrodes 72E include protrusions 75A and 75B along the boundary between the sub regions. According to the configuration of this comparative example, a difference in the direction of the electric lines of power between the two sides of the boundary for the sub regions is larger as similar to the configuration of the first example of the present invention shown in FIG. 6. Therefore, it is possible to accurately define the turning directions of the liquid crystal molecules in the respective regions, and thereby to avoid the liquid crystal molecules from being turned in the reverse direction to the desired turning direction in terms of the respective regions. That is, it is possible to fix the boundary between the liquid domains in the sub regions stably and to perform uniform and stable display as a consequence.

However, as it is apparent in FIG. 3B, a distance between the pixel electrode 71E and the common electrode 72E is reduced in the vicinity of the protrusions of the electrodes. Accordingly, a stronger electric field is generated in that region as compared to the region actually used for the display. When performing a dark (black) display, a voltage below a threshold voltage for causing a change in the alignment of the liquid crystal is usually applied (in the case of a normally black mode). However, the relatively strong electric field in the vicinity of the protrusion still leads to a change in the aligning direction of the liquid crystal molecules in that case, thereby causing light leakage (a black blur) that triggers deterioration in display contrast. In addition, this configuration also has a problem that a short circuit between electrodes is apt to occur in a region where a distance between the liquid crystal driving electrodes is short in the vicinity of the protrusion of the electrode.

Third Comparative Example

A third comparative example relevant to the first example of the present invention will be described with reference to FIG. 4B. In the configuration of this comparative example, pixel electrodes 71F and common electrodes 72F are formed into curved shapes in the respective sub regions. That is, the direction of extension of these electrodes and the initial aligning direction (the vertical direction in the drawing) of the liquid crystal molecules are continuously changed in this configuration. In terms of a region outside the region enlarged and illustrated in FIG. 4B, the pixel electrodes 71F and common electrodes 72F are formed into the curved shapes. In other words, the direction of extension of these electrodes and the initial aligning direction of the liquid crystal molecules are continuously changed. Other structures of this comparative example are similar to the configuration of the first example of the present invention.

Figure 4A:
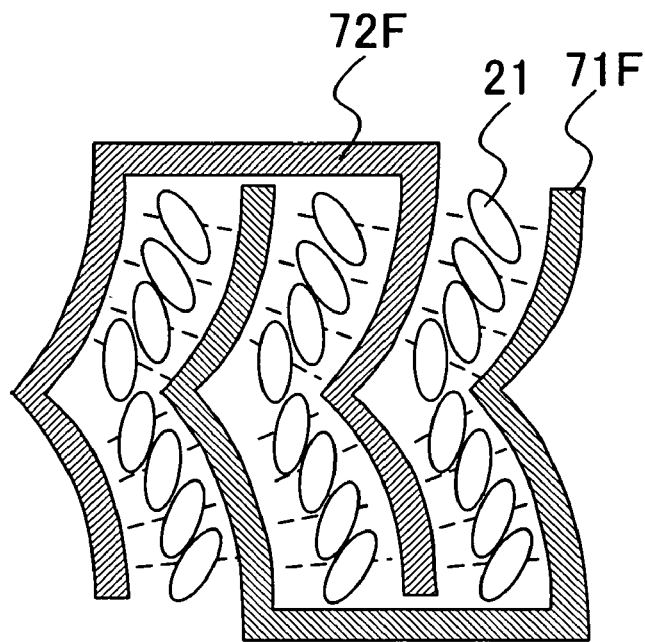
FIG. 4A is a plan view for explaining a configuration of still another conventional LCD.
Figure 4B:
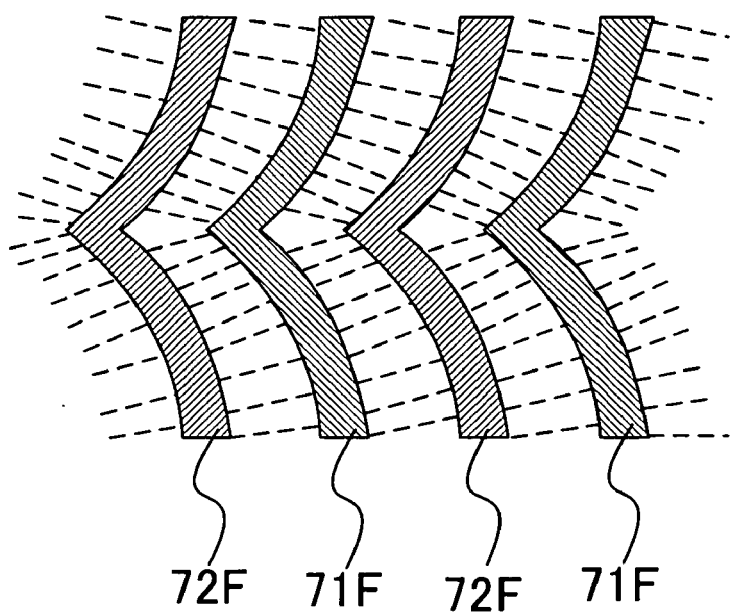
FIG. 4B is a plan view for explaining electric lines of force of liquid crystal driving electrodes in the LCD shown in FIG. 4A.

As shown in FIG. 4B, in the configuration of this comparative example, a difference in the direction of the electric lines of power between the two sides of the boundary for the sub regions becomes larger as similar to the configuration of the first example of the present invention shown in FIG. 6. Therefore, it is possible to accurately define the turning directions of the liquid crystal molecules in the respective regions, and thereby to avoid the liquid crystal molecules from being turned in the reverse direction to the desired turning direction in terms of the respective regions. That is, it is possible to fix the boundary between the liquid domains in the sub regions stably and to perform uniform and stable display as a consequence.

However, as it is apparent in FIG. 4B, the electrodes 71F and 72F are formed into the curved shapes, whereby the direction of extension of the electrodes that apply a lateral electric field to the liquid crystal layer is continuously changed. For this reason, it is not possible to optimize a voltage transmission rate characteristic by defining a uniform angle between the direction of extension of each of the electrodes and the initial aligning direction of the liquid crystal molecules. On the contrary, in the configuration of the first example of the present invention shown in FIG. 5A and FIG. 6, the liquid crystal driving electrodes extends straight in terms of the regions practically used for driving the liquid crystal layer to perform the display, and the direction of the extension thereof is optimized. Moreover, the direction of extension is changed only in the vicinity of the sub regions. For this reason, it is possible to uniformly optimize the angle defined between the direction of extension of the liquid crystal driving electrode and the initial aligning direction of the liquid crystal molecules in terms of each of the sub regions. In this way, it is possible to stabilize the boundary between the sub regions while maintaining a favorable voltage transmission rate characteristic.

The configurations of the first to third comparative examples have been described above. As it is apparent from the comparison with these comparative examples, it is possible to stably fix the boundary between the liquid crystal domains in the sub regions according to the configuration of the first example. As a consequence, it is possible to confirm an effect that this configuration achieves uniform and stable display.

As described previously, in the configuration of the first example, the angle defined between the initial aligning direction of the liquid crystal molecules and the direction of extension of the liquid crystal driving electrode is set to 15 degrees in terms of a main part practically used for applying the lateral electric field to the liquid crystal layer and for performing the display, and equal to 45 degrees in terms of the region in the vicinity of the boundary between the sub regions. However, the numerical values of these angles are not limited only to the foregoing, and it is possible to set the angles in a wider range where it is possible to obtain the function according to the above-described configuration of the present invention. To be more precise, in terms of the regions practically used for applying the lateral electric field to the liquid crystal layer for performing the display, it is possible to obtain a sufficiently smooth voltage transmission rate characteristic for performing gradation display in 256 scales or greater by setting the angle in a range of 5 to 25 degrees. In addition, a liquid crystal driving voltage may be set in a driving voltage range of some 5 to 7 V at the maximum in this case. Therefore, it is possible to set a favorable operating range in terms of the driving voltage as well.

Moreover, in the vicinity of the boundary between the sub regions, the angle defined between the initial aligning direction of the liquid crystal molecules and the direction of extension of the liquid crystal driving electrode is set larger than the relevant angle in the region practically used for the display. That is, in the vicinity of the boundary for the sub regions, the angle defined between the initial aligning direction of the liquid crystal molecules and the direction of extension of the liquid crystal driving electrode is set in a range of 15 to 75 degrees. In this way, it is possible to realize the function of the configuration of the present invention as described with reference to FIG. 6. In order to ensure this effect, it is preferable to set this angle equal to 30 degrees or more, or alternatively to set this angle equal to or above twice as long as the relevant angle at the region practically used for applying the lateral electric field to the liquid crystal to perform the display. Moreover, by setting this angle equal to or below 60 degrees, it is possible to avoid restriction of the freedom of pixel design attributable to large bending of the electrodes. As a result, it is possible to realize an excellent liquid crystal display device.

Meanwhile, assuming that the angle defined between the initial aligning direction and the direction of extension of the liquid crystal driving electrode is set to an angle $\theta_1$ in terms of the region practically used for applying the lateral electric field to the liquid crystal and equal to an angle $\theta_2$ in the vicinity of the boundary between the first sub region 1 and the second sub region 2, then the angle $\theta_2$ is set greater than the angle $\theta_1$. Preferably, the angle $\theta_2$ is set twice as large as the angle $\theta_1$, or greater.

According to the configuration of the present invention, there may be the case where a distance between the pixel electrode 71 and the common electrode 72 (hereinafter referred to as a distance between electrodes) may become narrower in the vicinity of the boundary between the sub regions as compared to the distances between electrodes in other regions. In this case, it is preferable to avoid the distance between electrodes from being significantly narrower in the vicinity of the boundary between the sub regions. It is easier to understand the reason for this requirement with reference to the configuration of the second comparative example shown in FIG. 3A. Specifically, if the distance between electrodes becomes significantly narrower in part, a strong electric field is generated in the vicinity of the bent portions and changes the aligning direction of the liquid crystal molecules even when a voltage lower than the threshold voltage is applied for black display. Accordingly, this configuration bears such a problem that light transmittance is increased at the time of the black display and display contrast is thereby degraded. Here, the distance between the pixel electrode 71 and the common electrode 72 is defined as the shortest distance between these electrodes.

To be more precise, it is recommended to set the distance between electrodes in the vicinity of the boundary between the sub regions no less than 0.2 times of the distances between electrodes in other regions. More preferably, it is recommended to set the distance between electrodes in the vicinity of the boundary between the sub regions no less than 0.5 times of the distances between electrodes in other regions. Even more preferably, it is recommended to set the distance between electrodes in the vicinity of the boundary between the sub regions no less than 0.8 times of the distances between electrodes in other regions. In this way, a locally strong electric field is hardly generated. Accordingly, it is possible to realize a favorable liquid crystal display device without degrading the display contrast. Alternatively, in order to avoid the distance between electrodes from being significantly narrower in the vicinity of the boundary between the sub regions, it is also possible to reduce the electrode width of the pixel electrode 71 and/or the common electrode 72 as compared to the width in other regions.

In the configuration of the present invention, the bent portions in the liquid crystal driving electrode used for generating the electric field in the lateral direction for driving the liquid crystal may be either pointed or rounded.

Second Example

Figure 7:
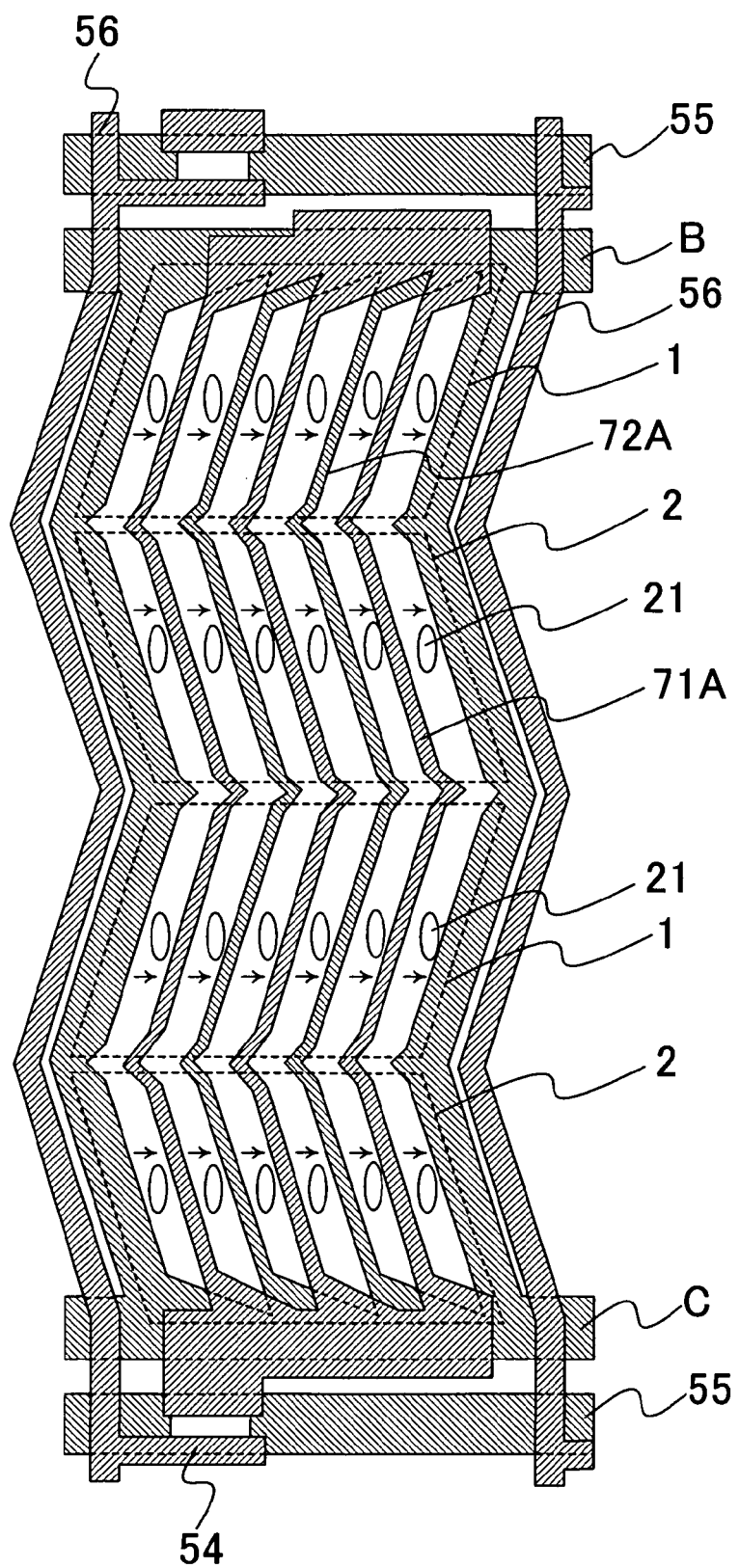
FIG. 7 is a plan view for explaining a configuration of an LCD according to a second example of the present invention.

An LCD according to a second example of the present invention will now be described with reference to FIG. 7. In this example, the number of bending a pixel is set to three times for each pixel as shown in FIG. 7. Therefore, each pixel has four sub regions. Specifically, in this example, a pixel electrode 71A and a common electrode 72A are bent three times. Other features of the LCD except the pixel electrodes 71A and the common electrodes 72A that are bent three times are similar to those in the configuration of the example shown in FIG. 5A.

In the configuration of this example as well, the turning directions of the liquid crystal molecules are stabilized in the vicinity of the boundary between the sub regions. Therefore, it is possible to perform even and stable display. Note that the LCD shown in FIG. 7 can be manufactured in accordance with a manufacturing method which is similar to the manufacturing method for the LCD shown in FIG. 5A.

Third Example

Figure 8:
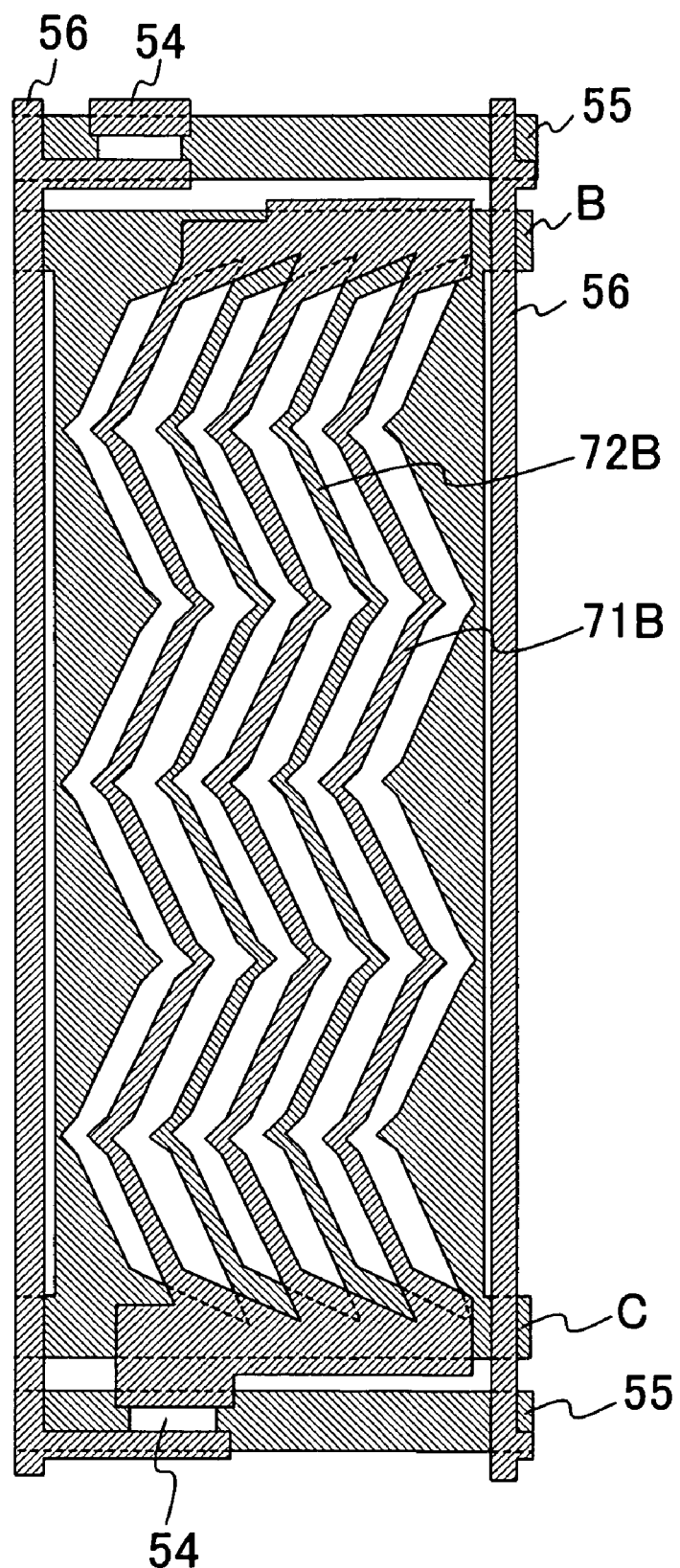
FIG. 8 is a plan view for explaining a configuration of an LCD according to a third example of the present invention.

FIG. 8 is a plan view showing a configuration of a liquid crystal display device according to a third example of the present invention. In this example, the number of bending a pixel is set to five times for each pixel. Therefore, each pixel has six sub regions. Specifically, in this example, a pixel electrode 71b and a common electrode 72b are bent five times. Configurations except those of the pixel electrodes 71b and the common electrodes 72b that are bent five times are similar to the configuration of the example shown in FIG. 5A.

In the configuration of this example as well, the turning directions of the liquid crystal molecules are stabilized in the vicinity of the boundary between the sub regions. Therefore, it is possible to perform even and stable display. Note that the LCD shown in FIG. 8 can be manufactured in accordance with a manufacturing method which is similar to the manufacturing method of the LCD shown in FIG. 5A.

Fourth Example

An LCD according to a fourth example of the present invention will now be described with reference to FIG. 9A, FIG. 9B, and FIG. 10A to FIG. 10C. In this example, pixel electrodes 71C and common electrodes 72C are formed on a different layer from layers of gate bus lines 55A and drain bus lines 56A by use of an organic interlayer film 60. The pixel electrodes 71C and the common electrodes 72C are formed into a pattern similar to the first example, which is made of indium tin oxide (ITO), on the organic interlayer film 60. Meanwhile, the gate bus lines 55A and the drain bus lines 56A, which are patterns of Cr layers, are formed on the substrate 11 and on the interlayer insulating film 57, respectively.

In this example, the gate bus lines 55A are provided on the substrate 11 and the interlayer insulating film 57 is formed on the gate bus lines 55A. Then, the drain bus lines 56A are provided on this interlayer insulating film 57 and then the passivation film 59 is formed on the drain bus lines 56A. Moreover, the pixel electrodes 71C and the common electrodes 72C are provided above this passivation film 59. The pixel electrodes 71C are connected through the contact hole 61 to Cr layer formed in the same layer where the drain bus lines 56A are formed. And the common electrodes 72C are connected through the contact hole 62 to Cr layer formed in the same layer where the gate bus lines are formed.

Figure 9A:
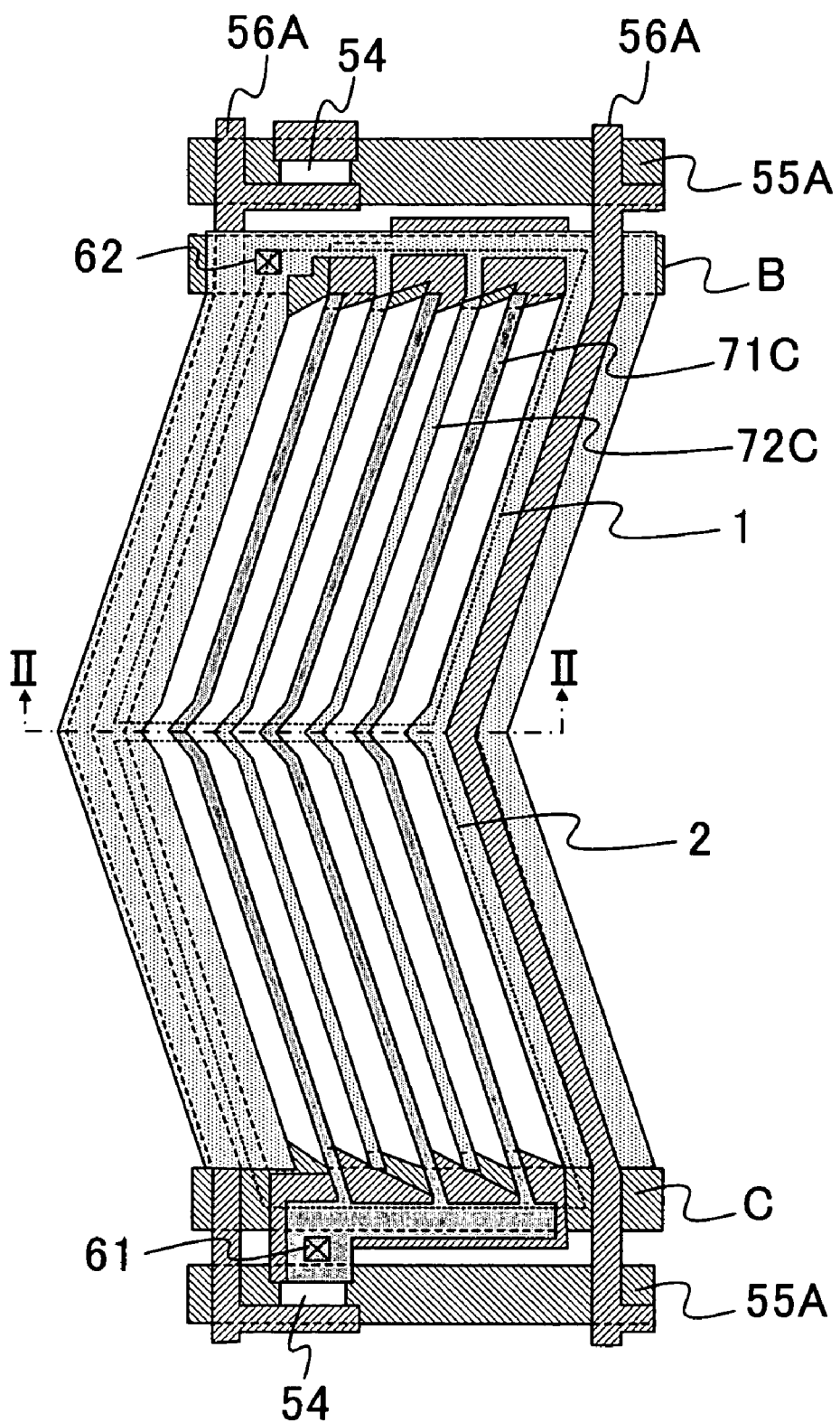
FIG. 9A is a plan view for explaining a configuration of an LCD according to a fourth example of the present invention.
Figure 9B:
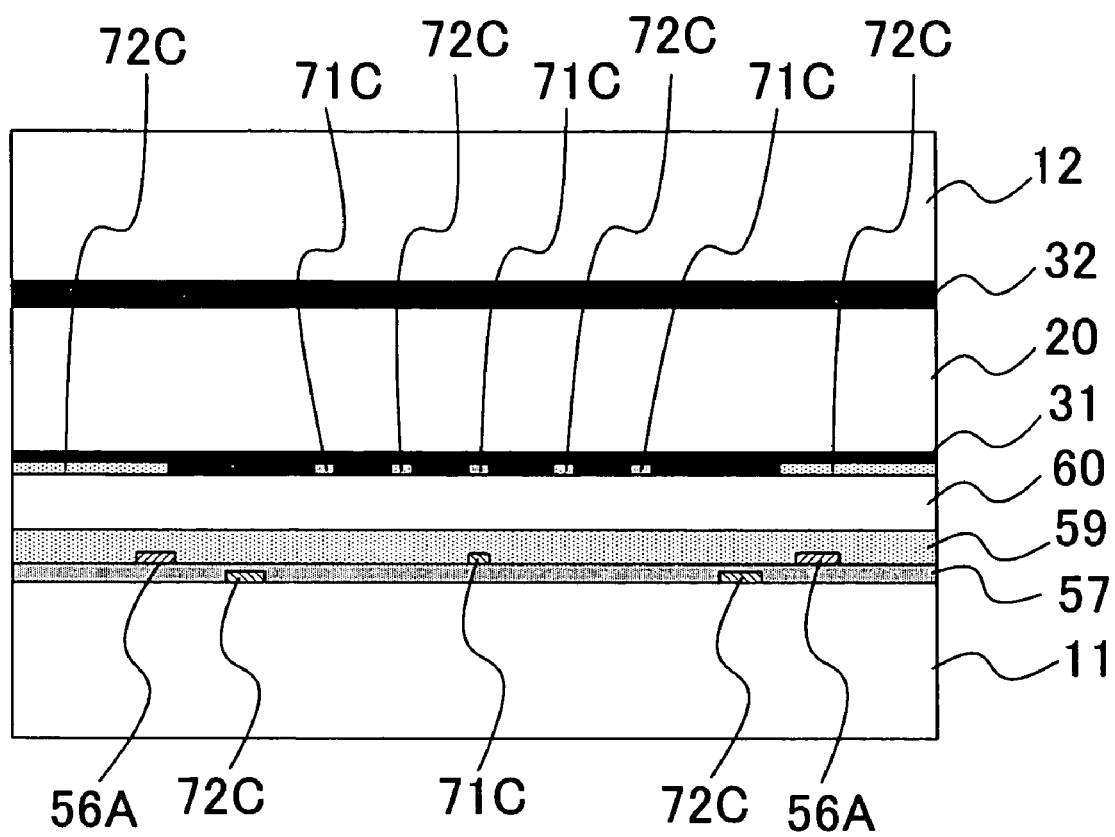
FIG. 9B is a cross-sectional view taken along the II-II line in FIG. 9A.
Figure 10A:
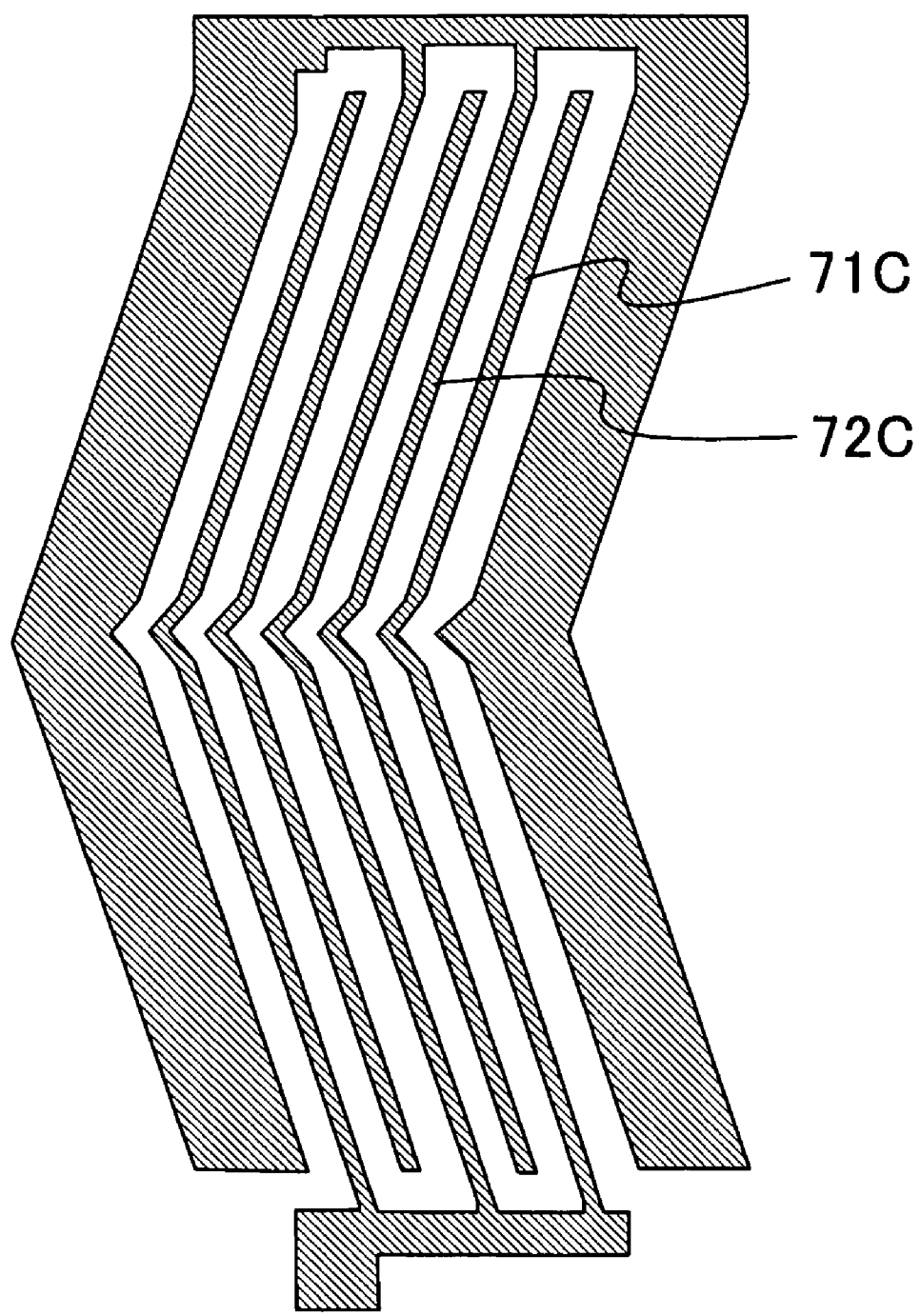
FIG. 10A to FIG. 10C are plan views for explaining configurations of gate bus lines, drain bus lines, and driving electrodes in the LCD shown in FIG. 9A.
Figure 10B:
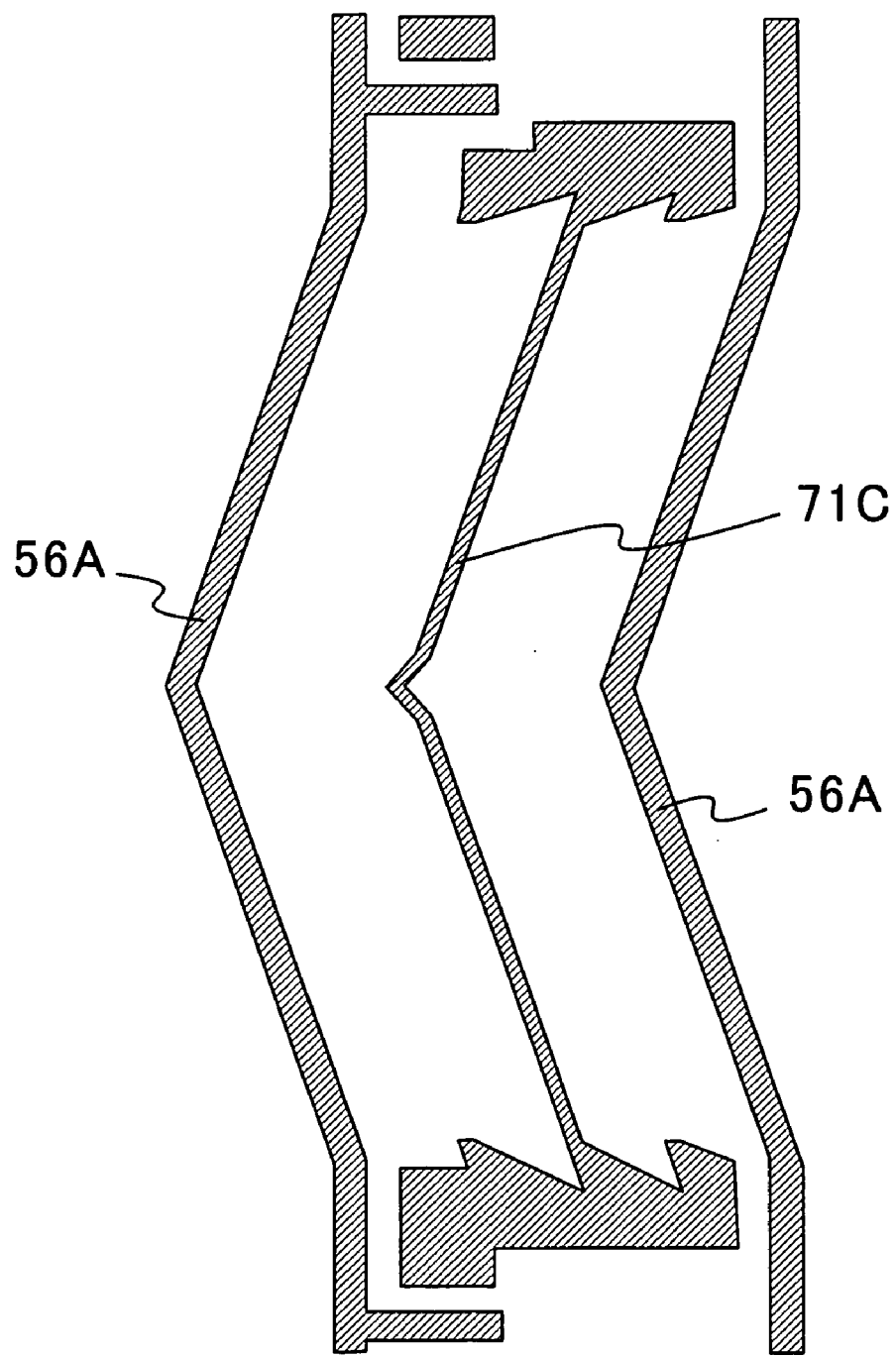
Figure 10C:
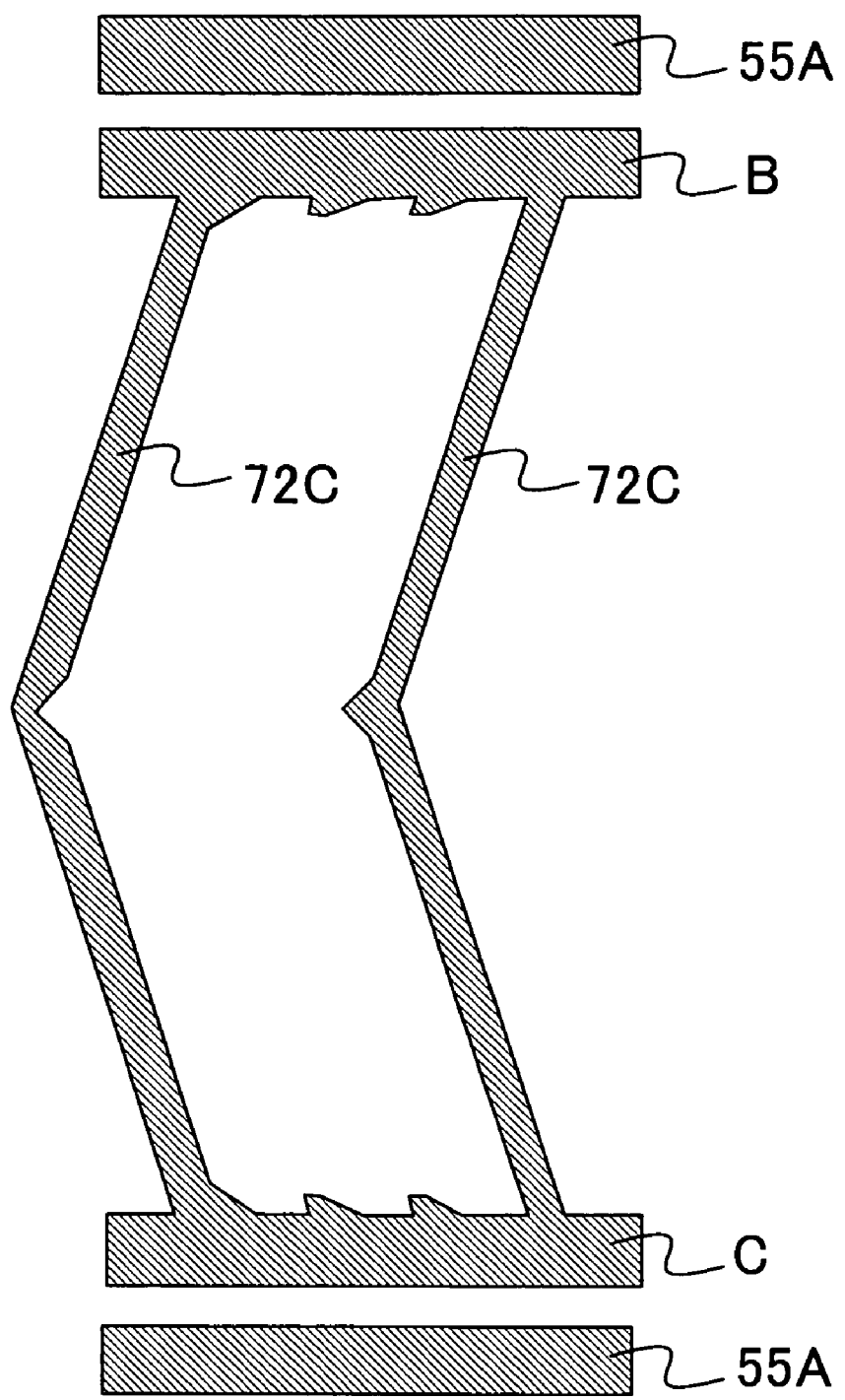

Next, a manufacturing process of the liquid crystal display device of this example will be described. First, the gate bus lines 55A made of Cr are formed on the first substrate 11 such as a glass substrate, and the interlayer insulating film 57 made of $SiN_x$ is formed to cover these constituents. Subsequently, an a-Si film serving as an active layer of transistors is formed into island shapes on the gate bus lines 55A while interposing the interlayer insulating film 57 therebetween. Further, the drain bus lines 56A made of Cr are formed thereon. Next, the passivation film 59 made of $SiN_x$ is formed to cover these structures. Then, the organic interlayer film 60 is formed on this passivation film 59. This organic interlayer film 60 is made of a material such as acrylic or novolac resin. The pixel electrodes 71C and the common electrodes 72C are formed on this organic interlayer film 60. The pixel electrodes 71C and the common electrodes 72C are formed into comb-tooth shapes by bending as illustrated in FIG. 9A. Then, the bent portions in the common electrodes 72C and the pixel electrodes 71C are patterned into the shape by the lithography method in which the tip ends of the portions bent into the V shape are caused to protrude further outward. Color filters and a light-shielding black matrix are formed on the other second substrate 12 such as a glass substrate.

Alignment films 31 and 32 made of polyimide are formed on respective surfaces of the active-matrix substrate and the color filter substrate constructed as described above. Alignment films 31 and 32 are uniformly subjected to an aligning treatment. Thereafter, the both substrates are put together to keep an interval of 4.5 μm. Then, for example, positive-type nematic liquid crystal having refractive index anisotropy of 0.067 is filled between the both substrates in a vacuum chamber. Thereafter, polarizing plates are attached to outer surfaces of the both substrates.

By the configuration of this example, it is possible to realize a structure which can suppress an influence of an electric field leaking from these bus lines 55A and 56A on the pixels. In the configuration of this example as well, the turning directions of the liquid crystal molecules are stabilized in the vicinity of the boundary between the sub regions. Accordingly, it is possible to perform uniform and stable display.

Fifth Example

As a fifth example of the present invention, an LCD of the present invention is configured by use of a so-called negative type liquid crystal material. Although a positive type liquid crystal material is used as the liquid crystal material in the first to fourth examples, a negative type liquid crystal material is applied to this example. The configuration of this example is substantially similar to the configuration of the first example shown in FIG. 5A. However, since this example applies the negative type liquid crystal material, the initial aligning direction of the liquid crystal is turned 90 degrees (in the horizontal direction in the drawing) relative to the direction indicated in FIG. 5A (the vertical direction in the drawing). Accordingly, the angle defined between the direction of extension of the pixel electrode 71 as well as the common electrode 72 and the initial aligning direction of the liquid crystal is set to 75 degrees in the region practically used for display and the angle is set to 45 degrees in the vicinity of the boundary between the sub regions. Other configurations of this example are similar to the configuration of the first example. In the configuration of this example, the angle defined between the initial aligning direction of the liquid crystal and the direction of extension of the liquid crystal driving electrode is set to 75 degrees in the region practically used for performing the display by applying a lateral electric field to the liquid crystal, and the angle is set to 45 degrees in the vicinity of the boundary between the sub regions. However, the numerical values of these angles are not limited only to the foregoing, and it is possible to set the angles in a wider range as long as it is possible to obtain the function according to the above-described configuration of the present invention. To be more precise, in terms of the regions practically used for performing the display by applying the lateral electric field to the liquid crystal, it is possible to obtain a sufficiently smooth voltage transmission rate characteristic for performing gradation display in 256 scales or greater by setting the angle in a range of 85 degrees to 65 degrees. In addition, the liquid crystal driving voltage in this case can be set in the driving voltage range of some 5 to 7 V at the maximum. Therefore, it is possible to set a favorable operating range in terms of the driving voltage as well.

Meanwhile, in the vicinity of the boundary between the sub regions, it is possible to realize a function according to the configuration of the present invention described with reference to FIG. 6 by setting the relevant angle smaller than the forgoing range (85 to 65 degrees), or namely, in a range of some 75 to 15 degrees. In order to ensure this effect, it is preferable to set this angle equal to 60 degrees or below, or alternatively to set this angle equal to or above twice as long as the relevant angle at the region practically used for performing display by applying the lateral electric field to the liquid crystal to perform the display. Moreover, by setting this angle equal to 30 degrees or more, it is possible to avoid restriction of the freedom of pixel design attributable to large bending of the electrodes. As a result, it is possible to realize an excellent liquid crystal display device.

Meanwhile, assuming that the angle defined between the initial aligning direction and the direction of extension of the liquid crystal driving electrode is set to an angle $\theta_3$ in terms of the region practically used for performing the display by applying the lateral electric field to the liquid crystal, and the angle is set to an angle $\theta_4$ in the vicinity of the boundary between the first sub region 1 and the second sub region 2, then an angle expressed by $(90°-\theta_4)$ is set greater than an angle expressed by $(90°-\theta_3)$. Preferably, the angle $(90°-\theta_4)$ is set twice as large as the angle $(90°-\theta_3)$ or greater.

In the configuration of this example as well, the turning directions of the liquid crystal molecules are stabilized in the vicinity of the sub regions. Accordingly, it is possible to perform uniform and stable display. Moreover, it is needless to say that it is possible to apply a negative type liquid crystal material in terms of the configurations as described in the second to fourth example of the present invention while turning the initial aligning direction of the liquid crystal in the amount of 90 degrees.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. A liquid crystal driving electrode for a liquid crystal display device with mutually engaged comb-shaped electrodes in a pixel region, each of the comb-shaped electrodes comprising: bent portions each in a double V shape which is formed as a comb-tooth pattern by causing a bent tip being bent into a V shape to protrude further outward, wherein an electrode width at the bent portions in the comb-shaped electrode is smaller than an electrode width of the comb-shape electrode at the portions other than the bent portions.

2. The liquid crystal driving electrode according to claim 1, wherein the comb-shaped electrode includes a pattern having a plurality of the bent portions each in the double V shape.

3. The liquid crystal driving electrode according to claim 1, wherein the line that joins the midpoints of the bent portions is parallel to another line that joins pivot points on said sides of the electrode at the bent portions, said bent portions extending from the portions other than the bent portions at said pivot points.

4. The liquid crystal driving electrode according to claim 1, wherein a distance between electrodes at the bent portions in said each of the comb-shaped electrodes is set more than 0.2 times long as a distance between electrodes at the portions other than the bent portions in the comp-shaped electrode.

5. A liquid crystal display device comprising: a first substrate; a second substrate disposed opposite to the first substrate; a liquid crystal layer disposed between the two substrates; and a driving electrode formed on the first substrate, wherein the liquid crystal driving electrode includes a comb-shaped electrode for applying a liquid crystal driving electric field to the liquid crystal layer in a direction substantially parallel to the first substrate, wherein the comb-shaped electrode includes bent portions each in a double V shape which is formed as a comb-tooth pattern by causing a bent tip being bent into a V shape to protrude further outward, and wherein an electrode width at the bent portions in the comb-shaped electrode is smaller than an electrode width of the comb-shape electrode at the portions other than the bent portions.

6. The liquid crystal display device according to claim 5, wherein a pixel region is divided into sub regions having different aligning directions of liquid crystal molecules upon application of a driving current at a boundary defined as the line that joins the midpoints of the bent portions in the double V shape of respective electrodes in the comb-shaped electrode.

7. The liquid crystal display device according to claim 5, wherein the comb-shaped electrode includes a pixel electrode and a common electrode having a plurality of bent portions each in the double V shape.

8. The liquid crystal display device according to claim 7, wherein the pixel electrode and the common electrode of the comb-shaped electrode are disposed on different layers.

9. The liquid crystal display device according to claim 7, wherein the pixel electrode and the common electrode of the comb-shaped electrode are disposed on the same layer with an interlayer film interposed in between.

10. The liquid crystal display device according to claim 9, wherein the interlayer film comprises an organic interlayer film.

11. The liquid crystal display device according to claim 5, wherein the liquid crystal layer comprises a positive type liquid crystal composition.

12. The liquid crystal display device according to claim 11, wherein an angle defined between an initial aligning direction of the liquid crystal molecules in the liquid crystal layer and a direction of extension of the electrodes at the portions other than the bent portions in the comb-shaped electrode is set in a range of 5 degrees to 25 degrees, and wherein an angle defined between the initial aligning direction of the liquid crystal molecules in the liquid crystal layer and a direction of extension of the electrodes at the bent portions in the comb-shaped electrode is set in a range of 15 to 75 degrees.

13. The liquid crystal display device according to claim 11, wherein an angle $\theta_1$ defined between the initial aligning direction of the liquid crystal molecules in the liquid crystal layer and the direction of extension of the electrodes at the portions other than the bent portions in the comb-shaped electrode is smaller than an angle $\theta_2$ defined between the initial aligning direction of the liquid crystal molecules in the liquid crystal layer and the direction of extension of the electrodes at the bent portions in the comb-shaped electrode.

14. The liquid crystal display device according to claim 13, wherein the angle $\theta_2$ is equal to twice or more as large as the angle $\theta_1$.

15. The liquid crystal display device according to claim 5, wherein the liquid crystal layer comprises a negative type liquid crystal composition.

16. The liquid crystal display device according to claim 15, wherein an angle defined between an initial aligning direction of the liquid crystal molecules in the liquid crystal layer and a direction of extension of the electrodes at the portions other than the bent portions in the comb-shaped electrode is set in a range of 85 to 65 degrees, and wherein an angle defined between the initial aligning direction of the liquid crystal molecules in the liquid crystal layer and a direction of extension of the electrodes at the bent portions in the comb-shaped electrode is set in a range of 75 to 15 degrees.

17. The liquid crystal display device according to claim 15, wherein an angle $\theta_3$ defined between the initial aligning direction of the liquid crystal molecules in the liquid crystal layer and the direction of extension of the electrodes at the portions other than the bent portions in the comb-shaped electrode is greater than an angle $\theta_4$ defined between the initial aligning direction of the liquid crystal molecules in the liquid crystal layer and the direction of extension of the electrodes at the bent portions in the comb-shaped electrode.

18. The liquid crystal display device according to claim 17, wherein the angle θ3 and the angle θ4 satisfy a following formula:

$$(90°-\theta_4) \geqq 2(90°-\theta_3).$$

19. The liquid crystal display device according to claim 5, wherein a distance between electrodes at the bent portions in the comb-shaped electrode is set more than 0.2 times as long as a distance between electrodes at the portions other than the bent portions in the comp-shaped electrode.

20. The liquid crystal display device according to claim 5, wherein the line that joins the midpoints of the bent portions is parallel to another line that joins pivot points on said sides of the electrode at the bent portions, said bent portions extending from the portions other than the bent portions at said pivot points.

21. A liquid crystal display device, comprising:
a first substrate;
a second substrate disposed opposite to the first substrate;
a liquid crystal layer disposed between the two substrates; and
a driving electrode formed on the first substrate,
wherein the liquid crystal driving electrode includes a comb-shaped electrode for applying a liquid crystal driving electric field to the liquid crystal layer in a direction substantially parallel to the first substrate,
wherein the comb-shaped electrode includes bent portions each in a double V shape which is formed as a comb-tooth pattern by causing a bent tip being bent into a V shape to protrude further outward, and
wherein an electrode width at the bent portions in the comb-shaped electrode is smaller than an electrode width of the comb-shape electrode at portions other than the bent portions.

* * * * *